US011129182B2

(12) United States Patent
Huang et al.

(10) Patent No.: US 11,129,182 B2
(45) Date of Patent: Sep. 21, 2021

(54) MULTIPLE TIMING ADVANCE DESIGN FOR MULTIPLE TRANSMIT RECEIVE POINTS

(71) Applicant: QUALCOMM Incorporated, San Diego, CA (US)

(72) Inventors: Yi Huang, San Diego, CA (US); Wanshi Chen, San Diego, CA (US); Xiaoxia Zhang, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 21 days.

(21) Appl. No.: 16/535,927

(22) Filed: Aug. 8, 2019

(65) Prior Publication Data
US 2020/0053752 A1 Feb. 13, 2020

(30) Foreign Application Priority Data
Aug. 10, 2018 (GR) .............................. 20180100380

(51) Int. Cl.
*H04W 72/12* (2009.01)
(52) U.S. Cl.
CPC ... *H04W 72/1268* (2013.01); *H04W 72/1289* (2013.01)
(58) Field of Classification Search
None
See application file for complete search history.

(56) References Cited

U.S. PATENT DOCUMENTS

| 2015/0333879 | A1* | 11/2015 | Yang | H04W 56/0005 370/330 |
|---|---|---|---|---|
| 2017/0302419 | A1* | 10/2017 | Liu | H04W 48/12 |
| 2018/0048442 | A1* | 2/2018 | Sang | H04B 7/088 |
| 2018/0084546 | A1* | 3/2018 | Guo | H04W 56/0015 |
| 2018/0124724 | A1* | 5/2018 | Tsai | H04W 56/00 |

(Continued)

OTHER PUBLICATIONS

Huawei et al: "Considerations on Multi-panel Based Uplink Transmission," 3GPP Draft; R1-1701690, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 13, 2017-Feb. 17, 2017, Feb. 12, 2017, XP051208856, 3 pages, Retrieved from the Internet: URL: http://www.3gpp.org/ftp/Meetings_3GPP_SYNC/RAN1/Docs/ [retrieved on Feb. 12, 2017] the whole document.
(Continued)

Primary Examiner — Brandon M Renner
(74) Attorney, Agent, or Firm — Holland & Hart LLP

(57) ABSTRACT

Methods, systems, and devices for wireless communications are described. In some cases, multiple timing advances (TAs) may be configured for non-coherent joint transmission (NCJT) with respective transmit receive points (TRPs). For example, a NCJT mode may have multiple TAs semi-statically configured for the UE to follow for each TRP. In some cases, a TA index corresponding to a TA for a TRP may be added as a field to a sounding reference signal (SRS) resource definition (e.g., SRS resource configuration). Additionally or alternatively, the TA index may be determined from an SRS index transmitted by the TRP, where the TA index corresponds to a TA for uplink information in a physical uplink shared channel. Additionally or alternatively, the TA index may be included as a field in a physical uplink control channel (PUCCH) definition to indicate a TA for a corresponding PUCCH that the UE transmits to the TRP.

26 Claims, 24 Drawing Sheets

(56) References Cited

U.S. PATENT DOCUMENTS

| | | | | |
|---|---|---|---|---|
| 2019/0045481 A1* | 2/2019 | Sang | ................. | H04B 1/713 |
| 2019/0349066 A1* | 11/2019 | Yang | ................. | H04L 5/005 |
| 2019/0387547 A1* | 12/2019 | Shin | ................. | H04W 74/0833 |
| 2020/0007282 A1* | 1/2020 | Yoon | ................. | H04W 88/08 |
| 2020/0059967 A1* | 2/2020 | Kim | ................. | H04W 74/0833 |
| 2020/0245200 A1* | 7/2020 | Xiong | ................. | H04B 7/0695 |

OTHER PUBLICATIONS

Huawei et al: "Discussion on UL Multi-panel/TRP Operation," 3GPP Draft; R1-1715719, 3rd Generation Partnership Project (3GPP), Mobile Competence Centre; 650, Route Des Lucioles; F-06921 Sophia-Antipolis Cedex; France, vol. RAN WG1, No. Nagoya, Japan; Sep. 18, 2017-Sep. 21, 2017, Sep. 17, 2017, XP051339181, 6 pages, Retrieved from the Internet: URL: http://www.3gpp.org/ftp/Meetings_3GPP_SYNC/RAN1/Docs/ [retrieved on Sep. 17, 2017] the whole document.

Intel Corporation: "Discussion on Uplink Multi-panel and Multi-TRP Operation," 3GPP Draft; R1-1712541 Discussion on Uplink Multi-Panel and Multi-TRP Operation, 3rd Generation Partnership Project (3GPP), Mobile Competence Centre; 650, Route Des Lucioles; F-06921 Sophia-Antipolis, vol. RAN WG1, No. Prague, P.R. Czechia; Aug. 21, 2017-Aug. 25, 2017, Aug. 20, 2017, XP051315357, 3 Pages, Retrieved from the Internet: URL: http://www.3gpp.org/ftp/Meetings_3GPP_SYNC/RAN1/Docs/ [retrieved on Aug. 20, 2017] the whole document.

International Search Report and Written Opinion—PCT/US2019/046018—ISA/EPO—dated Oct. 24, 2019.

\* cited by examiner

MULTIPLE TIMING ADVANCE DESIGN FOR MULTIPLE TRANSMIT RECEIVE POINTS

CROSS REFERENCE

The present application for Patent claims the benefit of Greece Provisional Patent Application No. 20180100380 by HUANG, et al., entitled "MULTIPLE TIMING ADVANCE DESIGN FOR MULTIPLE TRANSMIT RECEIVE POINTS," filed Aug. 10, 2018, assigned to the assignee hereof, and expressly incorporated herein.

BACKGROUND

The present disclosure relates generally to wireless communications, and more specifically to multiple timing advance (TA) design for multiple transmit receive points (TRPs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE and a base station (e.g., TRP) may experience propagation delays for communications between the UE and base station (e.g., uplink and downlink transmissions). For example, an uplink grant may be transmitted by a base station that grants the UE access to resources for uplink transmission. The UE may utilize the granted resources but apply a time delay so that the uplink transmissions arrive at the base station at an expected time. The time delay may be indicated to the UE in a TA command sent by the base station (e.g., with the uplink grant, via higher layer signaling, etc.). Different UEs communicating with the base station may experience different propagation delays and, hence, may need different time delays. As such, in some cases, the different UEs may receive different TA commands based on the different propagation delays, so that corresponding uplink transmissions from the different UEs arrive at the base station without interfering. Additionally, a UE may be configured to operate based on a non-coherent joint transmission (NCJT) scheme to receive and/or transmit information from/to multiple base stations (e.g., different TRPs) contemporaneously. However, when communicating with the multiple base stations (e.g., the different TRPs) according to the NCJT scheme, the UE may experience different propagation delays for communications with the different TRPs, where delays may be significant in some cases. As such, TAs (e.g., different time delays) may be needed for UE communications with the different base stations. Efficient techniques are desired for supporting different TAs for communications with multiple TRPs (e.g., multiple base stations, multiple TRPs of different base stations, etc.).

SUMMARY

The described techniques relate to improved methods, systems, devices, and apparatuses that support multiple timing advance (TA) design for multiple transmit receive points (TRPs). Generally, the described techniques provide for indicating a TA index for a first uplink channel, where the TA index corresponds to a TA for the first uplink channel, and communicating on the first uplink channel based on the TA. In some cases, a user equipment (UE) may be configured to communicate with multiple TRPs and may transmit on the first uplink channel to a first TRP and/or a second TRP based on the TA indicated by the TA index. Additionally, the UE may be configured to communicate with the first TRP and the second TRP in a same component carrier. The TA index may be communicated (e.g., via radio resource control (RRC) signaling) through a sounding reference signal (SRS) resource definition that includes the TA index. Additionally or alternatively, the TA index may be communicated through an SRS index (SRI), through an uplink control channel resource configuration, etc. Accordingly, the UE may receive a first TA command for the first TRP and a second TA command for the second TRP, where the TA commands are indicated through the TA indexes as discussed above.

Based on the multiple TAs, collisions may occur between a first signal to be transmitted on the first uplink channel and a second signal to be transmitted on a second uplink channel. The UE may mitigate the collision based on a priority of one TA over the other TAs. The UE may also mitigate collisions by spatially multiplexing the first uplink channel to the first TRP and the second uplink channel to the second TRP. In other examples, the UE may communicate with three or more TRPs, for example, according to three or more respective TAs corresponding to the three or more TRPs.

A method of wireless communication at a UE is described. The method may include receiving an indication of a TA index for a first uplink channel, the UE configured to communicate with a first TRP and a second TRP, determining, based on the received indication of the TA index, a TA for the first uplink channel, and transmitting on the first uplink channel to the first TRP or the second TRP according to the determined TA.

An apparatus for wireless communication at a UE is described. The apparatus may include a processor, memory in electronic communication with the processor, and instructions stored in the memory. The instructions may be executable by the processor to cause the apparatus to receive an indication of a TA index for a first uplink channel, the UE configured to communicate with a first TRP and a second TRP, determine, based on the received indication of the TA index, a TA for the first uplink channel, and transmit on the first uplink channel to the first TRP or the second TRP according to the determined TA.

Another apparatus for wireless communication at a UE is described. The apparatus may include means for receiving an indication of a TA index for a first uplink channel, the UE configured to communicate with a first TRP and a second TRP, determining, based on the received indication of the TA index, a TA for the first uplink channel, and transmitting on the first uplink channel to the first TRP or the second TRP according to the determined TA.

A non-transitory computer-readable medium storing code for wireless communication at a UE is described. The code may include instructions executable by a processor to receive an indication of a TA index for a first uplink channel, the UE configured to communicate with a first TRP and a second TRP, determine, based on the received indication of the TA index, a TA for the first uplink channel, and transmit on the first uplink channel to the first TRP or the second TRP according to the determined TA.

In some examples of the method, apparatuses, and non-transitory computer-readable medium described herein, receiving the indication of the TA index for the first uplink channel may include operations, features, means, or instructions for receiving, via RRC signaling, an SRS resource or resource set configuration that includes the TA index.

In some examples of the method, apparatuses, and non-transitory computer-readable medium described herein, receiving the indication of the TA index for the first uplink channel may include operations, features, means, or instructions for receiving an SRI and identifying the TA index for the first uplink channel based on the received SRI.

In some examples of the method, apparatuses, and non-transitory computer-readable medium described herein, the SRI may be received in downlink control information (DCI).

In some examples of the method, apparatuses, and non-transitory computer-readable medium described herein, receiving the indication of the TA index for the first uplink channel may include operations, features, means, or instructions for receiving, via RRC signaling, an uplink control channel resource configuration that includes the TA index.

Some examples of the method, apparatuses, and non-transitory computer-readable medium described herein may further include operations, features, means, or instructions for receiving a first TA command for the first TRP and a second TA command for the second TRP and identifying that the UE is to transmit to the first TRP, where the TA for the first uplink channel may be determined based on the first TA command by identifying that the UE is to transmit to the first TRP.

Some examples of the method, apparatuses, and non-transitory computer-readable medium described herein may further include operations, features, means, or instructions for identifying that the UE is to transmit to the second TRP on a second uplink channel, where a second TA for the second uplink channel is determined based on a second TA command that includes a second TA index and transmitting on the second uplink channel to the second TRP according to the second TA.

Some examples of the method, apparatuses, and non-transitory computer-readable medium described herein may further include operations, features, means, or instructions for identifying a collision between a first signal to be transmitted on the first uplink channel and a second signal to be transmitted on a second uplink channel, identifying a priority between a first TA command for the first uplink channel and a second TA command for the second uplink channel, and dropping the first signal or the second signal based on the identified priority.

In some examples of the method, apparatuses, and non-transitory computer-readable medium described herein, identifying the priority between the first TA command for the first uplink channel and the second TA command for the second uplink channel may include operations, features, means, or instructions for prioritizing the first TA command over the second TA command based on the first TA command being associated with a primary TRP, or a semi-static configuration indicating the priority, or a service associated with the first signal to be transmitted on the first uplink channel, or the first TA command having been received more recently than the second TA command, or a combination thereof.

Some examples of the method, apparatuses, and non-transitory computer-readable medium described herein may further include operations, features, means, or instructions for identifying a collision between a first signal to be transmitted on the first uplink channel and a second signal to be transmitted on the second uplink channel, spatially multiplexing the first uplink channel and the second uplink channel in accordance with a spatial multiplexing configuration, and simultaneously transmitting the first signal and the second signal on the spatially multiplexed uplink channel and second uplink channel.

In some examples of the method, apparatuses, and non-transitory computer-readable medium described herein, the first uplink channel to the first TRP or the second TRP may include one of an SRS resource, or a physical uplink shared channel (PUSCH), or a physical uplink control channel (PUCCH).

In some examples of the method, apparatuses, and non-transitory computer-readable medium described herein, a second uplink channel to a different one of the first TRP or the second TRP may include a different one of the SRS resource, or the PUSCH, or the PUCCH.

In some examples of the method, apparatuses, and non-transitory computer-readable medium described herein, a second uplink channel to a different one of the first TRP or the second TRP may include a same one of the SRS resource, or the PUSCH, or the PUCCH.

In some examples of the method, apparatuses, and non-transitory computer-readable medium described herein, the UE may be configured to communicate with the first TRP and the second TRP in a same component carrier (CC).

A method of wireless communication at a base station is described. The method may include identifying a configuration for a UE to communicate with a first TRP at the base station and a second TRP and transmitting, to the UE based on the identified configuration, an indication of a TA index for a first uplink channel to the first TRP or the second TRP, the TA index to be used by the UE to determine a TA for the first uplink channel.

An apparatus for wireless communication at a base station is described. The apparatus may include a processor, memory in electronic communication with the processor, and instructions stored in the memory. The instructions may be executable by the processor to cause the apparatus to identify a configuration for a UE to communicate with a first TRP at the base station and a second TRP and transmit, to the UE based on the identified configuration, an indication of a TA index for a first uplink channel to the first TRP or the second TRP, the TA index to be used by the UE to determine a TA for the first uplink channel.

Another apparatus for wireless communication at a base station is described. The apparatus may include means for identifying a configuration for a UE to communicate with a first TRP at the base station and a second TRP and transmitting, to the UE based on the identified configuration, an indication of a TA index for a first uplink channel to the first TRP or the second TRP, the TA index to be used by the UE to determine a TA for the first uplink channel.

A non-transitory computer-readable medium storing code for wireless communication at a base station is described. The code may include instructions executable by a processor to identify a configuration for a UE to communicate with a first TRP at the base station and a second TRP and transmit, to the UE based on the identified configuration, an indication of a TA index for a first uplink channel to the first TRP or the second TRP, the TA index to be used by the UE to determine a TA for the first uplink channel.

In some examples of the method, apparatuses, and non-transitory computer-readable medium described herein, transmitting the indication of the TA index for the first uplink channel may include operations, features, means, or instructions for transmitting, via RRC signaling, an SRS resource or resource set configuration that includes the TA index.

In some examples of the method, apparatuses, and non-transitory computer-readable medium described herein, transmitting the indication of the TA index for the first uplink channel may include operations, features, means, or instructions for identifying the TA index for the first uplink channel and transmitting an SRI that indicates the TA index.

In some examples of the method, apparatuses, and non-transitory computer-readable medium described herein, the SRI may be transmitted in DCI.

In some examples of the method, apparatuses, and non-transitory computer-readable medium described herein, transmitting the indication of the TA index for the first uplink channel may include operations, features, means, or instructions for transmitting, via RRC signaling, an uplink control channel resource configuration that includes the TA index.

Some examples of the method, apparatuses, and non-transitory computer-readable medium described herein may further include operations, features, means, or instructions for transmitting, to the UE based on the identified configuration, an indication of a second TA index for a second uplink channel to the second TRP, the TA index to be used by the UE to determine a TA for the second uplink channel.

In some examples of the method, apparatuses, and non-transitory computer-readable medium described herein, the first uplink channel to the first TRP or the second TRP includes an SRS resource, or a PUSCH, or a PUCCH.

In some examples of the method, apparatuses, and non-transitory computer-readable medium described herein, a second uplink channel to a different one of the first TRP or the second TRP includes a different one of the SRS resource, or the PUSCH, or the PUCCH.

In some examples of the method, apparatuses, and non-transitory computer-readable medium described herein, a second uplink channel to a different one of the first TRP or the second TRP includes a same one of the SRS resource, or the PUSCH, or the PUCCH.

DETAILED DESCRIPTION

Figure 1:
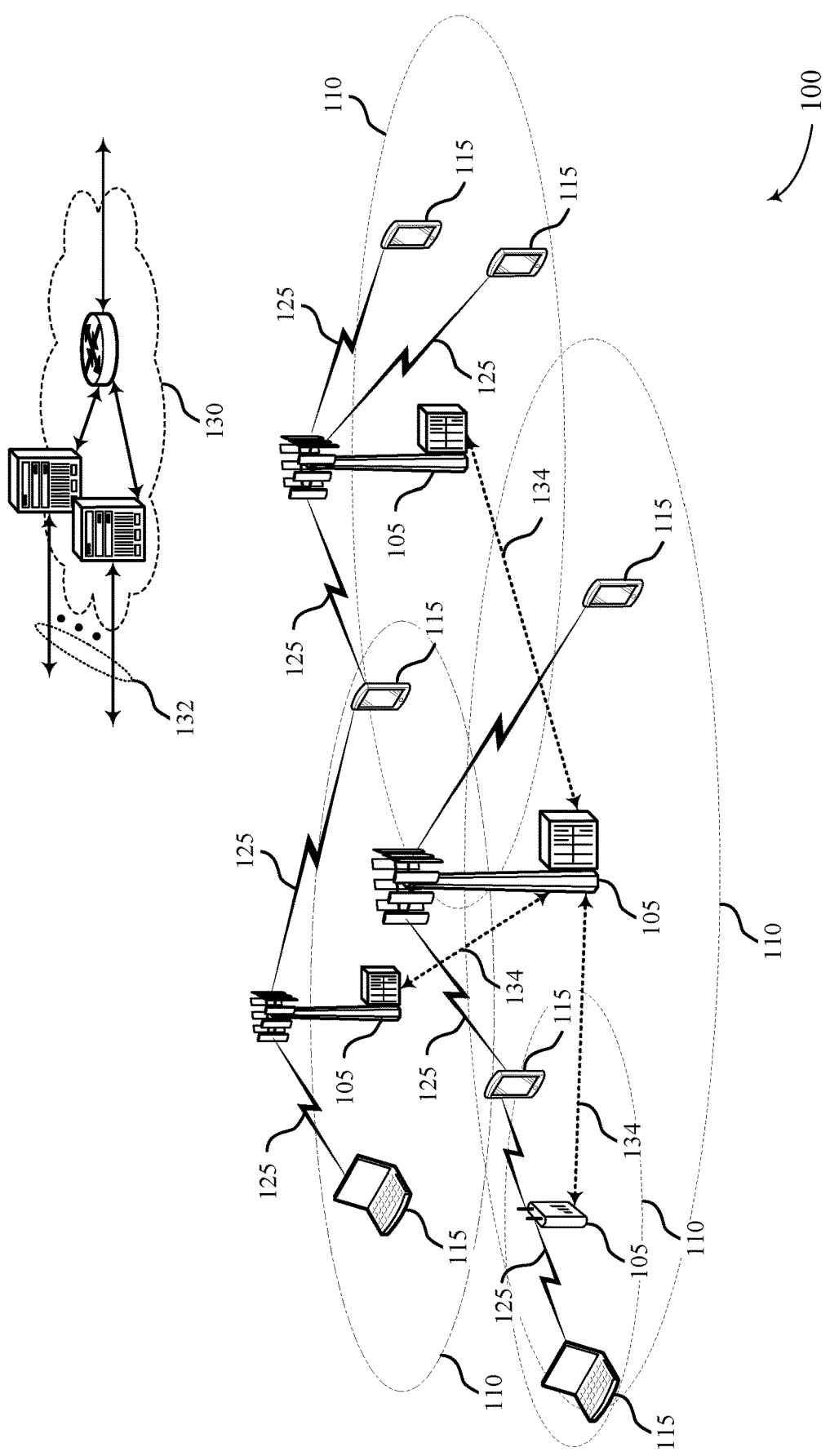
FIG. 1 illustrates an example of a system for wireless communications that supports a multiple timing advance (TA) design for multiple transmit receive points (TRPs) in accordance with aspects of the present disclosure.

In some wireless communications systems, a user equipment (UE) may communicate with one or more transmit receive points (TRPs) using a non-coherent joint transmission (NCJT) scheme. The NCJT scheme discussed herein may enable joint transmissions (JTs) (e.g., contemporaneous transmissions) to the multiple TRPs. Various NCJT techniques described herein may have a lower requirement for the backhaul speed, capacity, latency, etc., between TRPs and may allow transmissions to or from each TRP as independent data streams. A TRP may indicate an NCJT mode for the UE to receive corresponding JTs from the TRP and other TRPs. The UE 115 may then receive the downlink JTs based on the indicated NCJT mode. In some cases, the downlink JTs may indicate for the UE to transmit uplink information in response to the downlink JTs. However, for the uplink transmissions back to the TRP and/or the other TRPs, different propagation delays for each TRP may lead to different timing advances (TAs) for each TRP. For example, different TRPs may be at different distances from the UE, such that a farther TRP from the UE may result in longer radio propagation delays and a greater uplink TA. Additionally, in some cases, the different TRPs may experience different channel conditions, resulting in different TAs. A TRP may indicate an uplink TA to the UE for an uplink transmission, where the TA indicates a delay for the uplink transmission with respect to a received downlink timing in order to ensure a same uplink receive timing at the TRP, for example to align the times of arrival for uplink transmissions to different TRPs.

Accordingly, multiple TAs for respective TRPs for uplink NCJTs may be indicated to the UE. For example, for a subset of NCJT modes, a single TA mode may be utilized based on an ideal backhaul link between the TRPs, such that a UE transmits an uplink JT to a first TRP, and the first TRP forwards information in the uplink JT to the remaining TRPS over the ideal backhaul link. In some cases, the single TA may be hardcoded with each of the subset of NCJT modes. Alternatively, separate NCJT modes may have multiple TAs semi-statically configured for the UE to follow for each TRP. In some cases, a TA index corresponding to a TA for a TRP may be added as a field to a sounding reference signal (SRS) resource definition that the TRP transmits to the UE. Additionally or alternatively, the TA index may be determined from an SRS index (SRI) transmitted by the TRP, where the TA index corresponds to a TA for the UE to transmit uplink information to the TRP in a physical uplink shared channel (PUSCH). Additionally or alternatively, a TA index may be included as a field in a physical uplink control channel (PUCCH) definition to indicate a TA for a corresponding PUCCH that the UE transmits to the TRP. In some cases, two or more uplink transmissions may collide based on the multiple TAs for respective TRPs, and the collision may be mitigated by a priority given to one TA over the other TAs, such that the multiple uplink transmissions use the same prioritized TA, or may be mitigated by transmitting the multiple uplink transmissions simultaneously via multiple antennas or antenna panels (e.g., using spatial multiplexing).

Aspects of the disclosure are initially described in the context of a wireless communications system. An additional wireless communications system, an example of a TA design, uplink transmissions, and examples of process flows are then provided to describe aspects of the disclosure. Aspects of the disclosure are further illustrated by and described with reference to apparatus diagrams, system diagrams, and flowcharts that relate to multiple TA design for multiple TRPs.

FIG. 1 illustrates an example of a wireless communications system 100 that supports multiple TA design for multiple TRPs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying predetermined amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or resource blocks (RBs)) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink component carriers (CCs) and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may use coherent coordinated multipoint (CoMP) transmissions in which two or more TRPs (e.g., base stations 105) may transmit data to a UE 115 through several CoMP schemes, including dynamic point selection (DPS) in which different TRPs transmit data to a UE 115 at different times, JTs in which two or more TRPs contemporaneously transmit data to a UE 115, and coordinated beamforming (CBF) in which two or more TRPs coordinate signal transmissions that reduce interference between the two or more TRPs and/or with nodes in adjacent cells. Such traditional CoMP techniques may require significant coordination and backhaul communications between cooperating TRPs and may not be available for TRPs that have a less than ideal backhaul (e.g., delays exist for communications between the TRPs), which can limit the usefulness of JTs and reduce overall system throughput. NCJT techniques discussed herein may enable JTs in additional situations and may improve the user experience. Various NCJT techniques described herein may also have a lower requirement on the backhaul speed between TRPs and may allow transmissions from each TRP as independent data streams.

Various examples of NCJT techniques discussed herein provide JTs with a relatively low implementation complexity, which may allow implementation at UEs 115 with relatively few changes. In some examples, one or more TRPs may identify portions of a NCJT to be transmitted by different TRPs. In some examples, one or more TRPs may coordinate for NCJT communications and may format a first portion of the NCJT into a first codeword that may be received at the UE 115 as a first codeword of a single-user MIMO (SU-MIMO) transmission and a second portion of the NCJT into a second codeword that may be received at the UE 115 as a second codeword of the SU-MIMO transmission. The UE 115 may thus receive the NCJT from both TRPs (or one TRP) as different codewords using SU-MIMO demodulation and decoding. In some cases, each TRP may communicate with the UE 115 using a different layer, and in other cases, each TRP may utilize multiple layers to transmit a codeword (or transport block). RBs may be allocated in each layer to provide aligned RBs that are received at the UE 115.

One or more TRPs, which may be examples of base stations 105 as described above, may configure a UE 115 for NCJT through downlink control information (DCI) provided to the UE 115. The DCI, in some examples, may include one or more parameters to configure the UE 115 to receive the NCJT from both a first TRP and second TRP, or to configure the UE 115 to receive two codewords in two spatial layers from either the first TRP or the second TRP. Channel state information (CSI) processes at the UE 115 may be performed that assume the first TRP is a serving cell for the UE 115, the second TRP is a serving cell for the UE 115, or that both the first and second TRP are serving cells for the UE 115. In some examples, the UE 115 may have one or more additional CSI processes that may provide bundled or jointly encoded CSI information for the TRPs. Various examples provide for rate matching around reference signals of one or more TRPs, as well as transmit power control (TPC) techniques for NCJTs.

In some cases, the DCI for indicating the NCJT for the UE 115 may indicate an NCJT mode for corresponding downlink JTs. For example, a first NCJT mode (e.g., mode 1) may indicate that one physical downlink control channel (PDCCH) and one physical downlink shared channel (PDSCH) may be used for subsequent downlink JTs from one or more TRPs, where different layers from different TRPs may be used for the downlink JTs. A second NCJT mode (e.g., mode 2) may indicate two PDCCHs and one PDSCH, where the PDCCHs are repeated (e.g., two copies of same downlink information are included in the two PDCCHs, one from each TRP simultaneously). A third NCJT mode (e.g., mode 3) may indicate two PDCCHs and two respective PDSCHs, where the two PDSCHs use a same transport block (TB) and a same HARQ process. Accordingly, the PDSCHs may be repeated (e.g., same information) for the two respective PDSCHs, but the two PDSCHs may be transmitted on different resources (e.g., RBs/OFDM-symbols), which may improve reliability for receiving downlink information at the UE 115. A fourth NCJT mode (e.g., mode 4) may indicate two PDCCHs and two respective PDSCHs, where the two PDSCHs use different TBs and/or different HARQ processes. Accordingly, different information may be transmitted on the two PDSCHs from corresponding TRPs. A fifth NCJT mode (e.g., mode 5) may indicate one PDCCH, and two PDSCHs, where the PDSCHs are repeated (e.g., same TB and HARQ process but may be on different resources). A sixth NCJT mode (e.g., mode 6) may indicate one PDCCH and two PDSCHs, where the two PDSCHs use different TBs and/or different HARQ processes. Additionally, the different NCJT modes may be applied for coherent transmissions.

A type of backhaul link 132 between different TRPs (e.g., base stations 105) may determine, in part, the NCJT mode for downlink communications to the UE 115. For example, the backhaul link 132 may be an ideal or non-ideal backhaul. The ideal backhaul may indicate no delay for communications between the TRPs (e.g., 0 ms delay) and unlimited capacity for the backhaul link 132. Accordingly, the TRPs may be synchronized and be able to dynamically coordinate. Alternatively, the non-ideal backhaul may indicate a level of delay for communications between the TRPs (e.g., greater than five (5) ms)) and a limited capacity for the backhaul link 132. Accordingly, the TRPs may be unsynchronized and support semi-static coordination rather than the dynamic coordination that is afforded by the ideal backhaul. NCJT modes 1, 2, 3, 5, and 6 may necessitate coordination between multiple TRPs for utilizing a same channel and/or transmitting the same information on different channels. As such, NCJT modes 1, 2, 3, 5, and 6 may be used when the backhaul link 132 is ideal. Alternatively, NCJT mode 4 may or may not necessitate synchronization between multiple TRPs because the separate channels may be used for separate downlink messages. As such, NCJT mode 4 may be used when the backhaul link 132 is ideal or non-ideal.

A TRP may indicate an NCJT mode in DCI for UE 115 to receive corresponding JTs from the TRP and other TRPs. The UE 115 may then receive the downlink JTs based on the indicated NCJT mode. In some cases, the downlink JTs may indicate for the UE 115 to transmit uplink information in response to the downlink JTs. However, for the uplink transmissions back to the TRP and/or other TRPs, propagation delays for each TRP may lead to different TAs for each TRP. For example, a TRP may indicate an uplink TA to the UE 115 for uplink transmission(s), where the TA indicates a delay for the uplink transmission with respect to a received downlink timing in order to ensure a same uplink receive timing at each TRP. The farther away the UE 115 is from the TRP may result in longer radio propagation delays and a longer uplink TA. For a NCJT, different TAs may not be supported for multiple TRPs, where the UE 115 is to transmit uplink information to the multiple TRPs based on received downlink NCJTs.

Wireless communications system 100 may support efficient techniques for indicating multiple TAs for respective TRPs for uplink NCJTs. For example, for a subset of NCJT modes (e.g., NCJT modes 1, 2, 3, 5, and 6), a single TA mode may be utilized based on an ideal backhaul link 132 between the TRPs, such that a UE 115 transmits the uplink JT to a first TRP, and the first TRP forwards information in the uplink JT to the remaining TRPs over the ideal backhaul link 132. Accordingly, the single TA may be hardcoded with each NCJT mode of the subset of NCJT modes. Alternatively, separate NCJT modes (e.g., NCJT mode 4) may have multiple TAs semi-statically configured (e.g., via RRC signaling) for the UE 115 to follow for each TRP. In some cases, a TA index corresponding to a TA for a TRP may be added as a field to an SRS resource definition that the TRP transmits to the UE 115. Additionally or alternatively, the TA index may be determined from an SRI transmitted by the TRP, where the TA index corresponds to a TA for the UE 115 to transmit uplink information to the TRP in a PUSCH. Additionally or alternatively, a TA index may be included as a field in a PUCCH definition to indicate a TA for a corresponding PUCCH that the UE 115 transmits to the TRP. In some cases, two or more uplink transmissions may collide based on the multiple TAs for respective TRP, and the collision may be mitigated by a priority given to one TA over the other TAs, such that the multiple uplink transmissions use the same prioritized TA, or may be mitigated by transmitting the multiple uplink transmissions simultaneously via multiple antennas or antenna panels (e.g., using spatial multiplexing).

Figure 2:
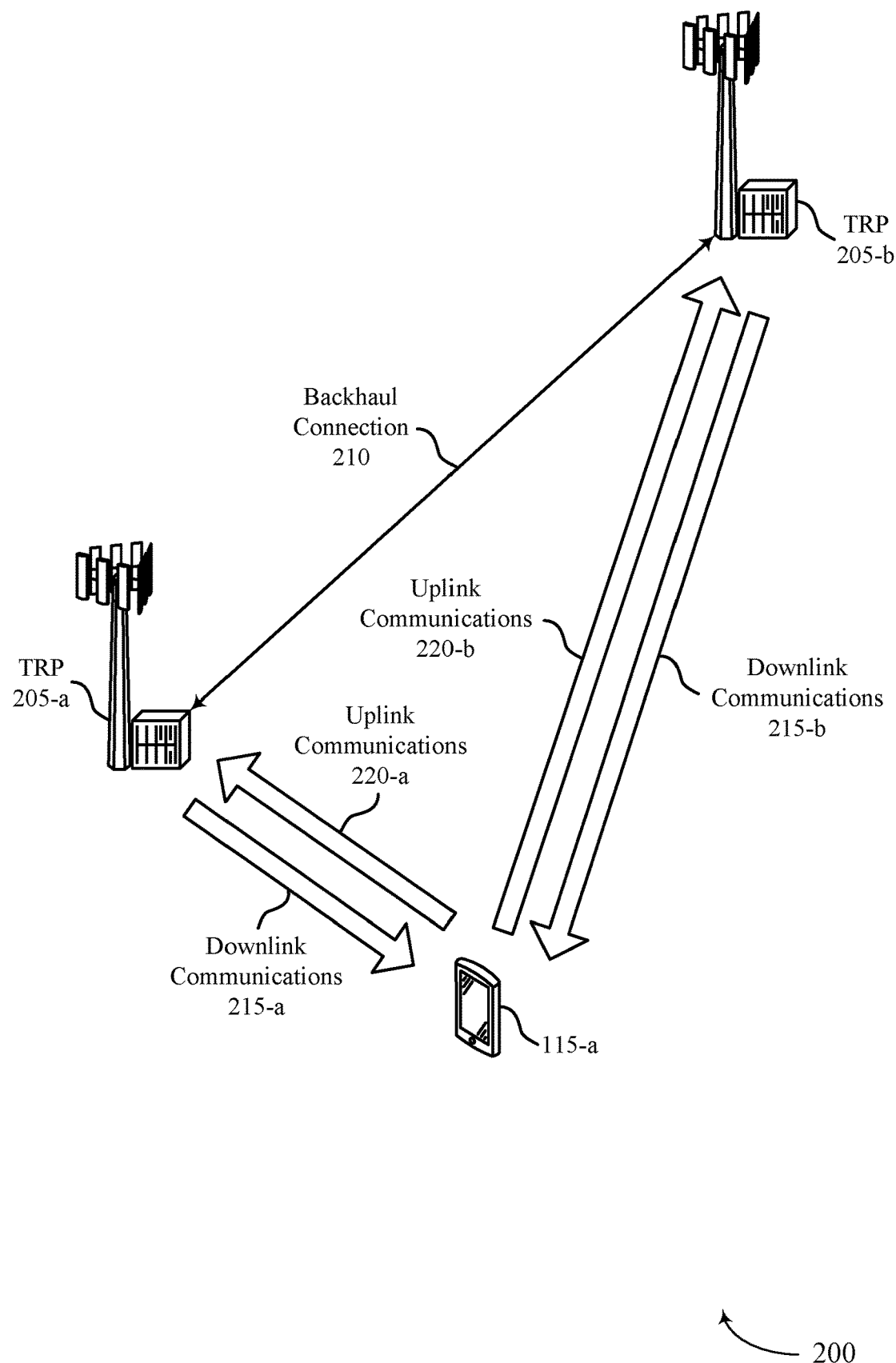
FIG. 2 illustrates an example of a wireless communications system that supports a multiple TA design for multiple TRPs in accordance with aspects of the present disclosure.

FIG. 2 illustrates an example of a wireless communications system 200 that supports multiple TA design for multiple TRPs in accordance with aspects of the present disclosure. In some examples, wireless communications system 200 may implement aspects of wireless communications system 100. Wireless communications system 200 may include a TRP 205-a and a TRP 205-b, which may be examples of base stations 105 as described above with reference to FIG. 1. Additionally or alternatively, TRPs 205-a and 205-b may be individual cells on a base station 105, access points (APs), a UE 115, or a similar wireless device capable of both transmitting and receiving data. Wireless communications system 200 may also include a UE 115-a, which may be an example of a UE 115 as described above with reference to FIG. 1. In some cases, UE 115-a may be in communication with both TRP 205-a and TRP 205-b simultaneously. Additionally, UE 115-a may transmit uplink information to both TRPs 205-a and 205-b on a single uplink CC.

As described herein, TRPs 205-a and 205-b may communicate with UE 115-a via a NCJT, where the same or different layers and the same or different control/shared channels may be utilized for non-coherent transmissions. For example, different NCJT modes may be utilized for the NCJT that indicate the number of control channels and shared channels (e.g., PDCCHs and PDSCHs, respectively) that are used for the non-coherent transmissions. In part, the NCJT mode may be determined by a backhaul connection 210 (e.g., a backhaul link) between TRP 205-a and TRP 205-b. For example, if backhaul connection 210 is an ideal backhaul connection (e.g., TRPs 205-a and 205-b are synchronized, no delay in backhaul communications, unlimited capacity, etc.), any of the NCJT modes (as described above) may be supported for the non-coherent transmissions. Alternatively, if backhaul connection 210 is non-ideal (e.g., TRPs 205-a and 205-b are unsynchronized, includes a greater than five (5) ms delay, limited capacity, etc.), a subset of the NCJT methods may be supported for the non-coherent transmissions (e.g., NCJT mode 4).

Additionally, when communicating with both TRP 205-a and 205-b, UE 115-a may experience different propagation delays based on different locations for TRPs 205-a and 205-b. For example, TRP 205-b may be farther from UE 115-a than TRP 205-a, leading to a larger propagation delay as transmissions take longer to reach either wireless device. Accordingly, a TA loop/command may be employed per TRP 205 to mitigate the different propagation delays. Based on the multiple TA loops, downlink communications 215 to UE 115-a may be synchronized, and uplink communications 220 to both TRP 205-a and TRP 205-b from UE 115-a may be synchronized. Additionally, based on the NCJT mode, different TA modes may be supported for downlink communications 215 and uplink communications 220.

For downlink communications 215 and uplink communications 220, a single TA mode or a multiple TA mode may be utilized based on the NCJT mode used and the quality of backhaul connection 210. For example, NCJT modes 1, 2, 3, 5, and 6 may support a single TA mode since each mode works with an ideal backhaul connection 210. The ideal backhaul connection 210 may enable TRPs 205-a and 205-b to coordinate when to transmit downlink communications 215-a and 215-b, respectively, to UE 115-a such that the transmissions arrive simultaneously. Additionally or alternatively, the ideal backhaul connection 210 may enable UE 115-a to send uplink communications 220 towards one TRP 205, and the one TRP 205 may forward the received uplink communications 220 to other TRPs 205 via the ideal backhaul connection 210. For example, UE 115-a may transmit uplink communications 220-a to TRP 205-a, and TRP 205-a may then forward the information in uplink communications 220-*a* to TRP 205-*b* via backhaul connection 210. Hence, a single TA may be enough, and the single TA mode may be employed. Accordingly, the single TA mode may be hard-coded with a corresponding downlink NCJT mode.

Alternatively, for other NCJT modes (e.g., NCJT mode 4), the TA mode may be configured semi-statically. For example, NCJT mode 4 may be supported for both an ideal or non-ideal backhaul connection 210 (e.g., the same or different control and shared channels can be used for either downlink communications 215 or uplink communications 220). For a non-ideal backhaul connection 210, respective TAs may be needed for each TRP 205 since they are not synchronized, and transmissions to or from each TRP 205 may be adjusted separately in order to be transmitted on a single uplink CC. Accordingly, a base station 105 (e.g., an eNB) may semi-statically configure (e.g., via RRC signaling) UE 115-*a* to follow a single TA mode (e.g., for an ideal backhaul connection 210) or a multiple TA mode (e.g., for a non-ideal backhaul connection 210), where additional signaling may be used to indicate the single or multiple TA mode.

In some cases, the additional signaling may include adding new fields for a TA index to a definition of a corresponding signal. For example, a TA index may be added as a new field to an SRS resource definition (e.g., SRS resource or resource set configuration) for an SRS to be transmitted from UE 115-*a* to a TRP 205, where the TA index indicates a TA for a corresponding SRS for uplink communications 220 (e.g., indicating a single or multiple TA mode). Each SRS resource may indicate information for UE 115-*a* to transmit a subsequent SRS to a TRP 205, including a port of the TRP 205 for transmitting the SRS to, starting and ending symbols for the SRS, a bandwidth (e.g., a set of RBs) for the SRS, and the TA index. Accordingly, if two SRS resources have the same port, symbol(s), and bandwidth information, but have different TA indexes, the two SRS resources may be considered two different SRS resources. Additionally or alternatively, for a PUSCH, the PUSCH may be linked to an SRI, where the SRI corresponds to the TA index as described above. Accordingly, UE 115-*a* may identify a TA for the PUSCH through a TA index that is indicated by the SRI. Additionally or alternatively, a TA index field may be added to a PUCCH definition to indicate a TA for a corresponding PUCCH.

Based on different TA loops or TA commands for different TRPs 205 (e.g., multiple TA mode), two or more uplink transmissions in uplink communications 220 may collide at UE 115-*a*. For example, UE 115-*a* may attempt to transmit the two or more uplink transmissions at the same time based on the different TA loops/commands that cause a misalignment at UE 115-*a*. To handle the collision, the different TAs may be given different priorities, and an uplink transmission associated with the higher priority TA may be transmitted, while the rest of the uplink transmissions dropped. For example, the priority may be based on a master/slave designation for corresponding TRPs 205 for which the uplink communications 220 are intended, a semi-static priority configuration for the TRPs 205, a type of service associated with the uplink communications (e.g., ultra-reliable low latency communications (URLLC) are prioritized over other uplink communications), when a TA command was received, or a combination thereof. Additionally or alternatively, the collision may be handled based on transmitting the two or more uplink transmissions simultaneously via multiple antennas or antenna panels (e.g., one uplink transmission per antenna or panel).

Figure 3:
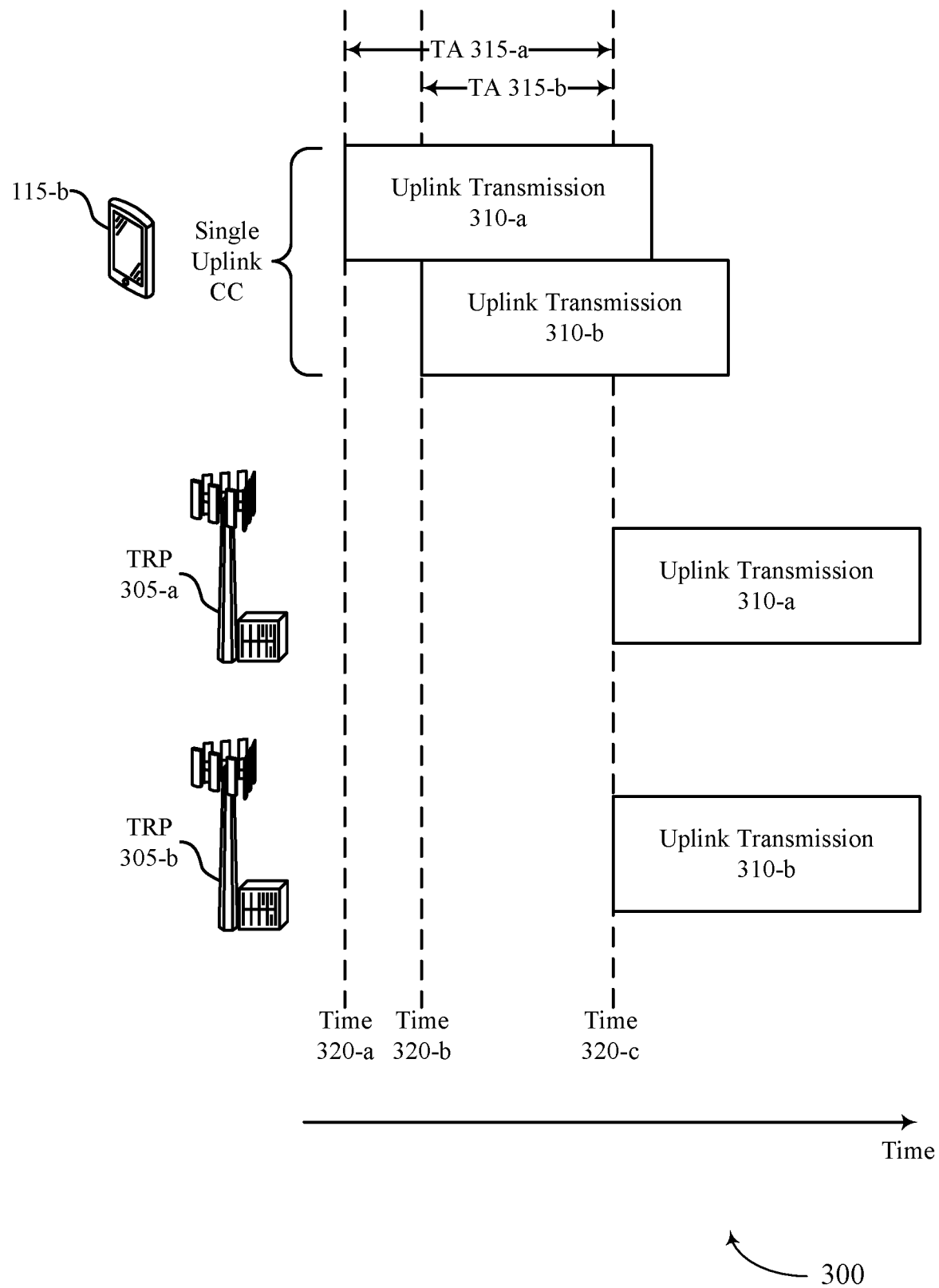
FIG. 3 illustrates an example of a TA design that supports a multiple TA design for multiple TRPs in accordance with aspects of the present disclosure.

FIG. 3 illustrates an example of a TA design 300 that supports multiple TA design for multiple TRPs in accordance with aspects of the present disclosure. In some examples, TA design 300 may implement aspects of wireless communications system 100 and/or 200. TA design 300 may include a UE 115-*b*, a TRP 305-*a*, and a TRP 305-*b*, which may be examples of corresponding UEs and TRPs (e.g., and/or base stations) as described above with reference to FIGS. 1-2. As described herein, UE 115-*b* may send one or more uplink transmissions 310 to both TRP 305-*a* and TRP 305-*b*, where the respective uplink transmissions 310 (e.g., PUCCHs, PUSCHs, SRSs, etc.) are transmitted based on corresponding TAs 315.

UE 115-*b* may transmit a first uplink transmission 310-*a* and a second uplink transmission 310-*b* on a single uplink CC. The first uplink transmission 310-*a* may be intended for TRP 305-*a*, and the second uplink transmission 310-*b* may be intended for TRP 305-*b*. However, the locations of TRPs 305-*a* and 305-*b* may lead to different propagation delays that result in a TA 315-*a* and a TA 315-*b*, respectively. TAs 315-*a* and 315-*b* may be indicated in an SRS resource definition, SRI, or PUCCH definition as described above with reference to FIGS. 1-2 (e.g., based on a TA index in the SRS resource definition, SRI, PUCCH, etc.). For example, TRP 305-*a* may indicate TA 315-*a* for sending uplink transmission 310-*a* in a first downlink transmission at time 320-*a*, and TRP 305-*b* may indicate TA 315-*b* for sending uplink transmission 310-*b* in a second downlink transmission at time 320-*b*. Additionally or alternatively, TRP 305-*a* may indicate TA 315-*a* and/or TA 315-*b* (e.g., with times 320-*a* and 320-*b*, respectively) for the corresponding uplink transmissions 310, or TRP 305-*b* may indicate TA 315-*a* and/or TA 315-*b* for the corresponding uplink transmissions 310. Based on the indicated TAs 315, each TRP 305-*a* and TRP 305-*b* may receive the respective uplink transmissions 310 at a time 320-*c* (e.g., at a same time).

Additionally or alternatively, TAs 315-*a* and 315-*b* may be configured for UE 115-*b* to transmit the corresponding uplink transmissions 310-*a* and 310-*b* at different times that do not overlap on the single uplink CC. Accordingly, each uplink transmission 310 may be received at the corresponding TRP 305 at different times. Alternatively, the TAs 315 may be configured such that the uplink transmissions 310 are transmitted during non-overlapping intervals, but may be received simultaneously at each TRP 305 at time 320.

Figure 4:
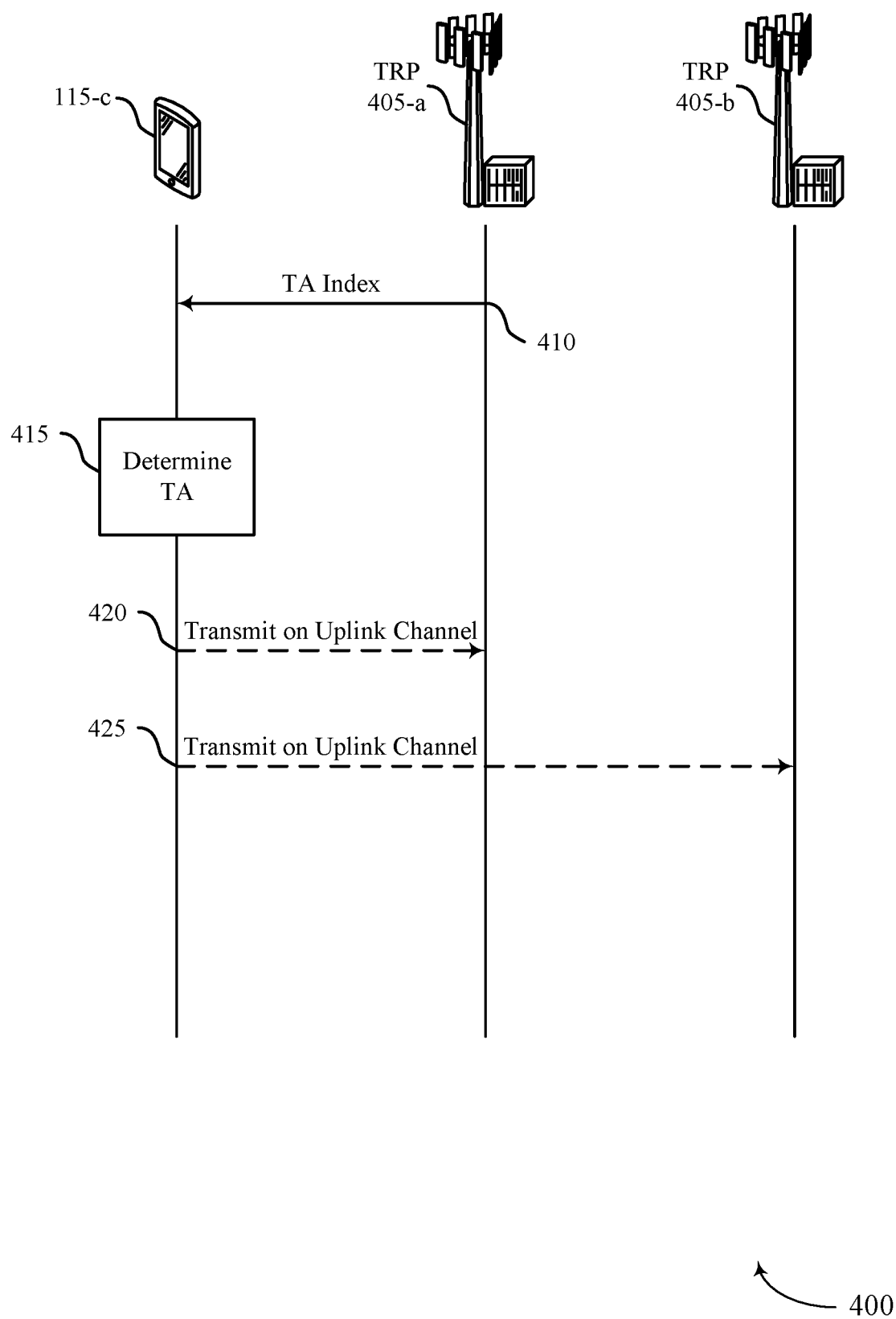
FIGS. 4-7 illustrate examples of process flows that support a multiple TA design for multiple TRPs in accordance with aspects of the present disclosure.

FIG. 4 illustrates an example of a process flow 400 that supports multiple TA design for multiple TRPs in accordance with aspects of the present disclosure. In some examples, process flow 400 may implement aspects of wireless communications system 100 and/or 200. Process flow 400 may include a UE 115-*c*, a TRP 405-*a*, and a TRP 405-*b*, which may be examples of corresponding devices as described above with reference to FIGS. 1-3. UE 115-*c* may be configured to communicate with TRPs 405-*a* and 405-*b* according to NCJT, where multiple TAs are used for respective TRPs 405-*a* and 405-*b* within a single uplink CC.

In the following description of the process flow 400, the operations between UE 115-*c*, TRP 405-*a*, and TRP 405-*b* may be performed in different orders or at different times. Certain operations may also be left out of the process flow 400, or other operations may be added to the process flow 400. It is to be understood that while UE 115-*c*, TRP 405-*a*, and TRP 405-*b* are shown performing a number of the operations of process flow 400, any wireless device may perform the operations shown.

At 410, UE 115-*c* may receive, from TRP 405-*a*, an indication of a TA index for a first uplink channel. In some cases, UE 115-*c* may be configured to communicate with both TRP 405-*a* (e.g., a first TRP) and TRP 405-*b* (e.g., a second TRP). Additionally, UE 115-*c* may be configured to communicate with TRP 405-*a* and TRP 405-*b* in a same CC.

At 415, UE 115-*c* may determine, based on the received indication of the TA index, a TA for the first uplink channel.

At 420, UE 115-*c* may transmit on the first uplink channel to TRP 405-*a* according to the determined TA. In some cases, the first uplink channel to TRP 405-*a* may include one of an SRS resource, or a PUSCH, or a PUCCH.

At 425, UE 115-*c* may transmit on the first uplink channel to TRP 405-*b* according to the determined TA from the received TA index via TRP 405-*a*. In some cases, a second uplink channel to TRP 405-*b* may be transmitted in addition to the first uplink shared channel to TRP 405-*a*. Additionally, the second uplink channel to TRP 405-*b* may include a different one of the SRS resource, or the PUSCH, or the PUCCH used for the first uplink channel. Alternatively, the second uplink channel to TRP 405-*a* may include a same one of the SRS resource, or the PUSCH, or the PUCCH used for the first uplink channel.

Additionally or alternatively, UE 115-*c* may receive a first TA command for TRP 405-*a* and a second TA command for TRP 405-*b*. For example, the first TA command may indicate a first TA index corresponding to a first TA to transmit a first uplink message (e.g., one of the SRS resource, the PUSCH, the PUCCH, etc.) on the first uplink channel to TRP 405-*a*, and the second TA command may indicate a second TA index corresponding to a second TA to transmit a second uplink message on a second uplink channel to TRP 405-*b*. Accordingly, UE 115-*c* may identify that it is to transmit to TRP 405-*a*, where the TA for the first uplink channel is determined based on the first TA command by identifying that UE 115-*c* is to transmit to TRP 405-*a*. Additionally, in some cases, UE 115-*d* may identify that it is to transmit to TRP 405-*b*, where the TA for the second uplink channel is determined based on the second TA command by identifying that UE 115-*c* is to transmit to TRP 405-*b*.

Figure 5:
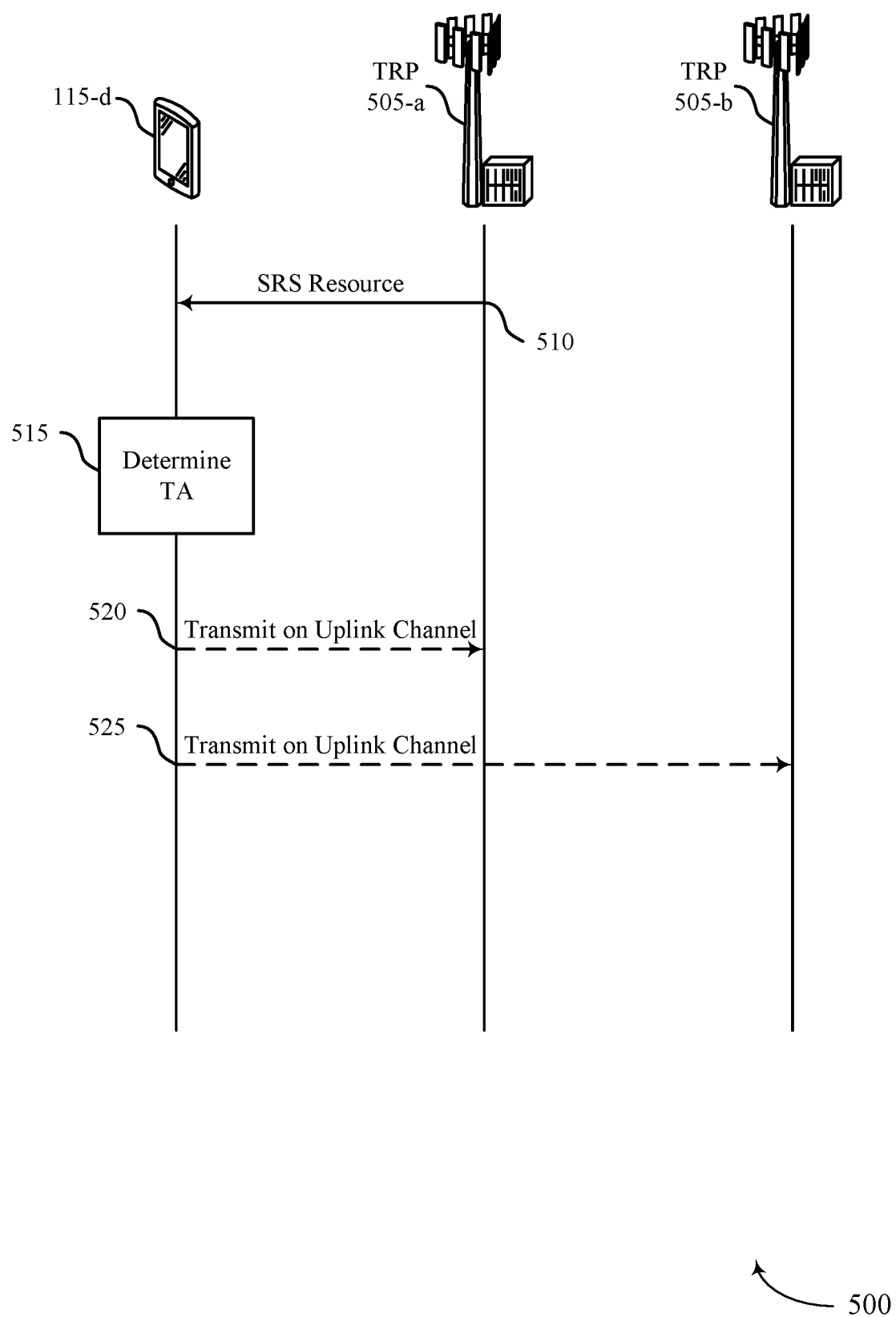

FIG. 5 illustrates an example of a process flow 500 that supports multiple TA design for multiple TRPs in accordance with aspects of the present disclosure. In some examples, process flow 500 may implement aspects of wireless communications system 100 and/or 200. Process flow 500 may include a UE 115-*d*, a TRP 505-*a*, and a TRP 505-*b*, which may be examples of corresponding devices as described above with reference to FIGS. 1-4. UE 115-*d* may be configured to communicate with TRPs 505-*a* and 505-*b* according to NCJT, where multiple TAs are used for respective TRPs 505-*a* and 505-*b* within a single uplink CC.

In the following description of the process flow 500, the operations between UE 115-*e*, TRP 505-*a*, and TRP 505-*b* may be performed in different orders or at different times. Certain operations may also be left out of the process flow 500, or other operations may be added to the process flow 500. It is to be understood that while UE 115-*d*, TRP 505-*a*, and TRP 505-*b* are shown performing a number of the operations of process flow 500, any wireless device may perform the operations shown.

At 510, UE 115-*d* may receive, via RRC signaling, an SRS resource or resource set configuration (e.g., SRS resource definition) that includes a TA index for a first uplink channel. Each SRS resource may indicate information for UE 115-*d* to transmit a subsequent SRS to a TRP 505, including a port of the TRP 505 for transmitting the SRS to, starting and ending symbols for the SRS, a bandwidth (e.g., a set of RBs) for the SRS, and the TA index. Accordingly, if two SRS resources have the same port, symbol(s), and bandwidth information, but have different TA indexes, the two SRS resources may be considered two different SRS resources. UE 115-*d* may then perform 515, 520, and 525 similarly to the corresponding steps as described above with reference to 415, 420, and 425 in FIG. 4. For example, UE 115-*d* may transmit on the first uplink channel to TRP 505-*a* and/or 505-*b* (e.g., at 520 and 525, respectively) based on the TA index included in the SRS resource or resource set. Additionally or alternatively, UE 115-*d* may transmit separate uplink channels to TRPs 505-*a* and 505-*b* based on separate TAs (e.g., as indicated by separate TA commands and TA indexes as indicated in one or more SRS resource or resource set configurations).

Figure 6:
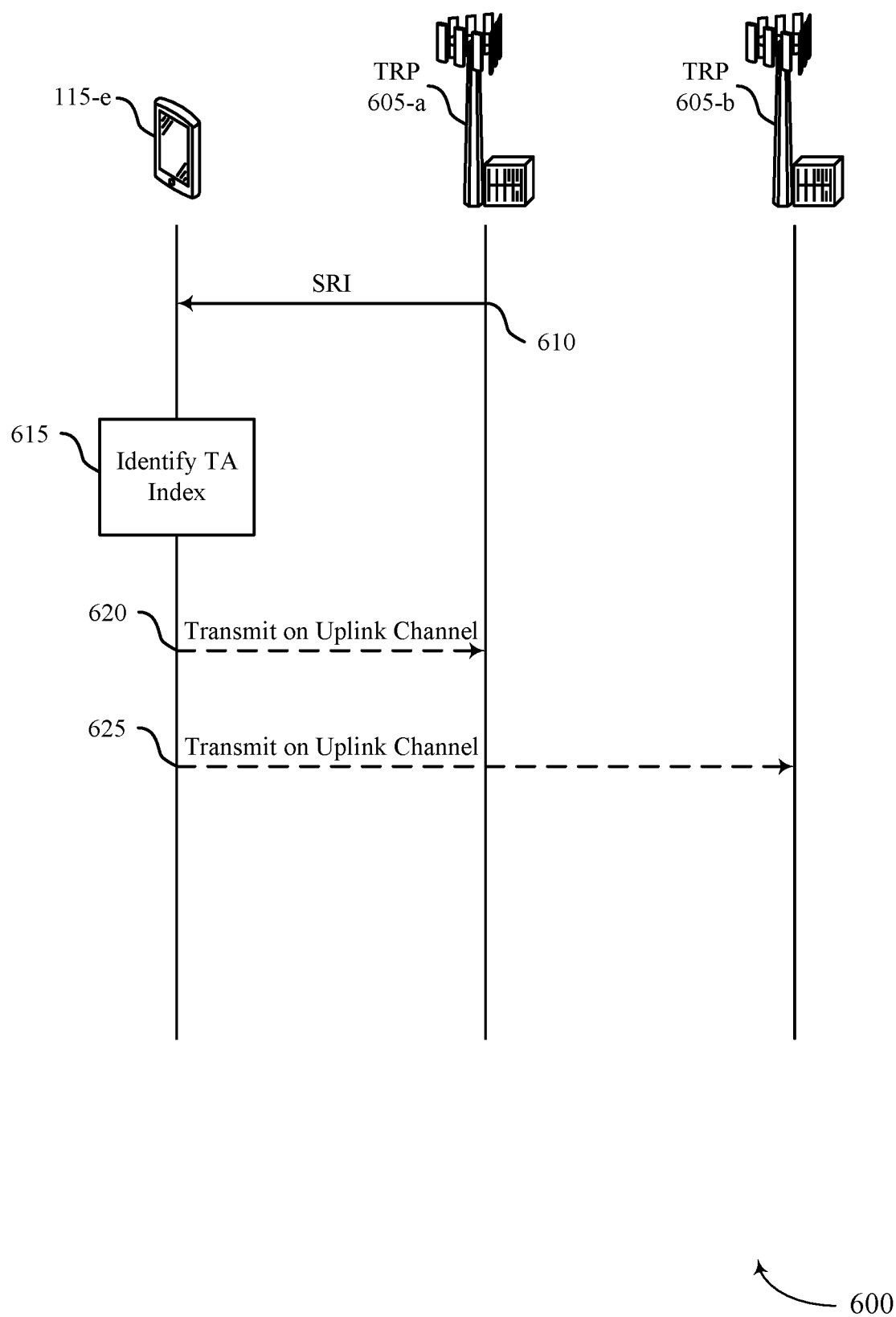

FIG. 6 illustrates an example of a process flow 600 that supports multiple TA design for multiple TRPs in accordance with aspects of the present disclosure. In some examples, process flow 600 may implement aspects of wireless communications system 100 and/or 200. Process flow 600 may include a UE 115-*e*, a TRP 605-*a*, and a TRP 605-*b*, which may be examples of corresponding devices as described above with reference to FIGS. 1-5. UE 115-*e* may be configured to communicate with TRPs 605-*a* and 605-*b* according to NCJT, where multiple TAs are used for respective TRPs 605-*a* and 605-*b* within a single uplink CC.

In the following description of the process flow 600, the operations between UE 115-*e*, TRP 605-*a*, and TRP 605-*b* may be performed in different orders or at different times. Certain operations may also be left out of the process flow 600, or other operations may be added to the process flow 600. It is to be understood that while UE 115-*e*, TRP 605-*a*, and TRP 605-*b* are shown performing a number of the operations of process flow 600, any wireless device may perform the operations shown.

At 610, UE 115-*e* may receive an SRI. In some cases, the SRI may be received in DCI.

At 615, UE 115-*e* may identify a TA index for a first uplink channel based on the received SRI. In some cases, for a PUSCH, the PUSCH may be linked to the SRI, where the SRI corresponds to the identified TA index. Accordingly, UE 115-*e* may identify a TA for the PUSCH through the TA index that is indicated by the SRI. UE 115-*e* may then transmit on the first uplink channel to TRP 605-*a* and/or 605-*b* (e.g., at 620 and 625, respectively) based on the TA index identified in the SRI. For example, UE 115-*e* may transmit on the PUSCH based on the TA index identified in the SRI. Additionally or alternatively, UE 115-*e* may transmit separate uplink channels to TRPs 605-*a* and 605-*b* based on separate TAs (e.g., as indicated by separate TA commands and TA indexes as indicated in one or more SRIs).

Figure 7:
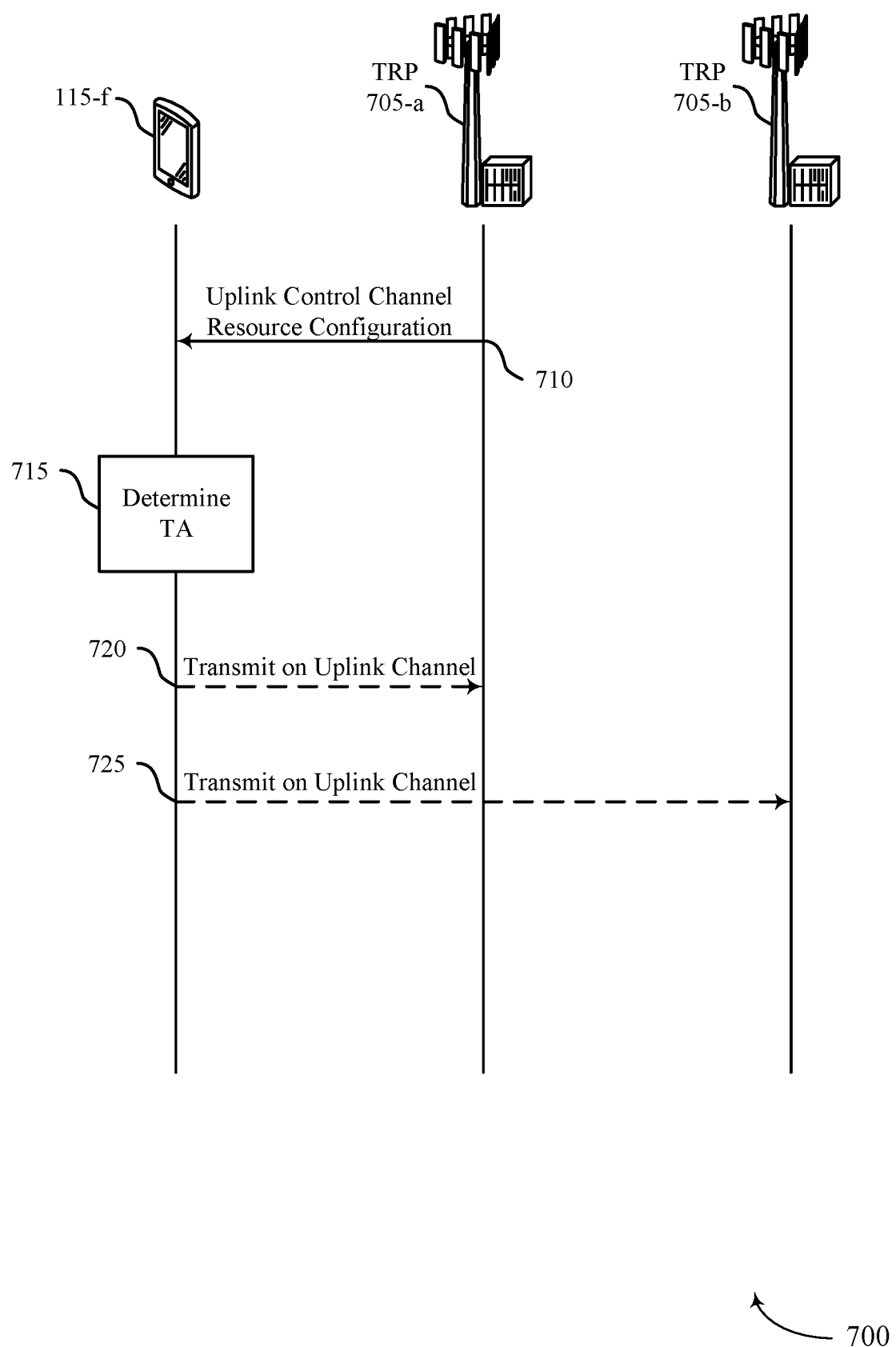

FIG. 7 illustrates an example of a process flow 700 that supports multiple TA design for multiple TRPs in accordance with aspects of the present disclosure. In some examples, process flow 700 may implement aspects of wireless communications systems 100 and/or 200. Process flow 700 may include a UE 115-*f*, a TRP 705-*a*, and a TRP 705-*b*, which may be examples of corresponding devices as described above with reference to FIGS. 1-6. UE 115-*f* may be configured to communicate with TRPs 705-*a* and 705-*b* according to NCJT, where multiple TAs are used for respective TRPs 705-*a* and 705-*b* within a single uplink CC.

In the following description of the process flow 700, the operations between UE 115-*f*, TRP 705-*a*, and TRP 705-*b* may be performed in different orders or at different times. Certain operations may also be left out of the process flow 700, or other operations may be added to the process flow 700. It is to be understood that while UE 115-*f*, TRP 705-*a*, and TRP 705-*b* are shown performing a number of the operations of process flow 700, any wireless device may perform the operations shown.

At 710, UE 115-f may receive, via RRC signaling, an uplink control channel resource configuration that includes a TA index for a first uplink channel. UE 115-f may then perform 715, 720, and 725 similarly to the corresponding steps as described above with reference to 415/515/615, 420/520/620, and 425/525/625 in FIGS. 4-6. For example, UE 115-f may transmit on the first uplink channel to TRP 705-a and/or 705-b (e.g., at 720 and 725, respectively) based on the TA index included in the uplink control channel resource configuration, for example, in a field of the PUCCH definition. In some cases, the uplink control channel resource configuration may include a PUCCH configuration, and UE 115-f may transmit the first uplink channel over a corresponding PUCCH. Additionally or alternatively, UE 115-f may transmit separate uplink channels (e.g., PUCCHs) to TRPs 705-a and 705-b based on separate TAs (e.g., as indicated by separate TA commands and TA indexes as indicated in one or more uplink control channel resource configurations). For example, UE 115-f may transmit a first PUCCH (e.g., PUCCH 1) to TRP 705-a based on a first TA determined from a first TA index (e.g., TA index 1) in a resource configuration for the first PUCCH and may transmit a second PUCCH (e.g., PUCCH 2) to TRP 705-b based on a second TA determined from a second TA index (e.g., TA index 2) in a resource configuration for the second PUCCH.

Figure 8A:
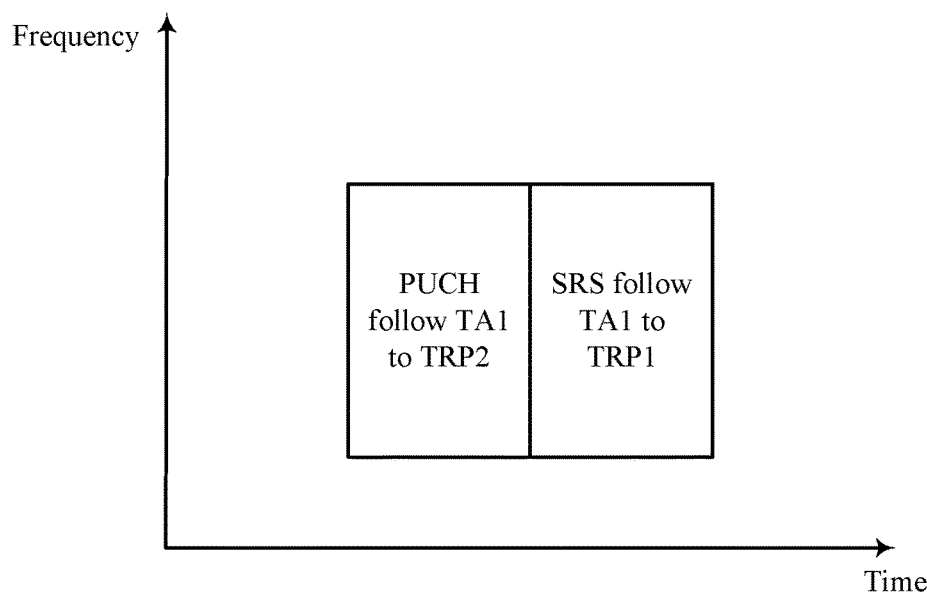
FIGS. 8A and 8B illustrate examples of uplink transmissions that support a multiple TA design for multiple TRPs in accordance with aspects of the present disclosure.
Figure 8B:
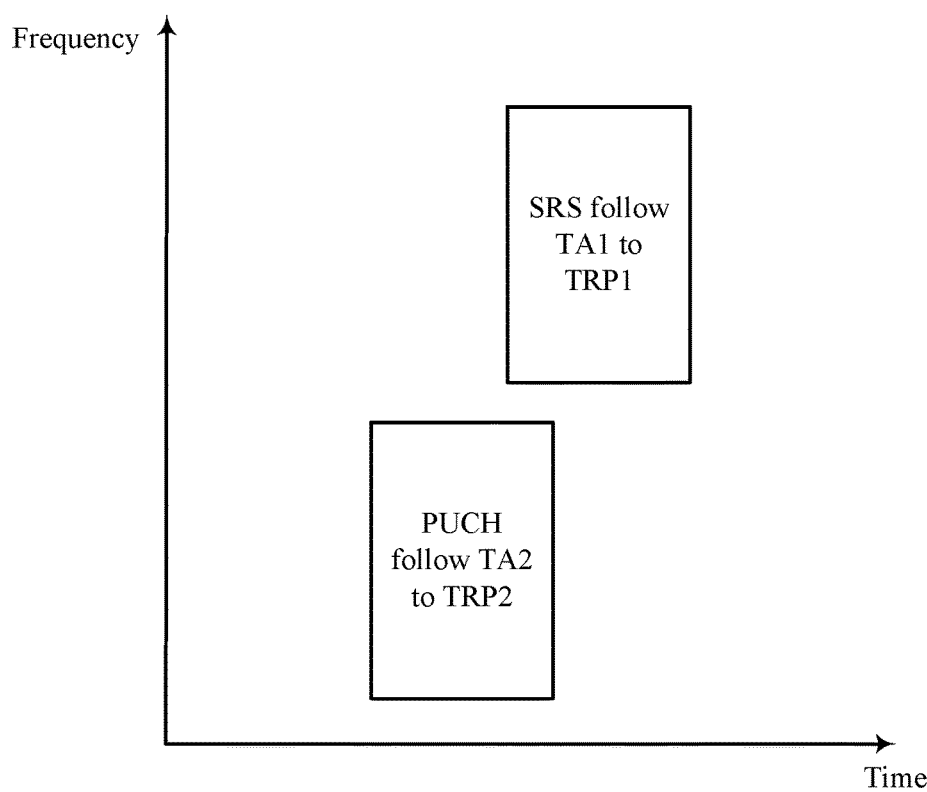

FIGS. 8A and 8B illustrate examples of uplink transmissions 800 and 801 that support multiple TA design for multiple TRPs in accordance with aspects of the present disclosure. In some examples, uplink transmissions 800 and 801 may implement aspects of wireless communications system 100 and/or 200. A UE 115 may transmit one or more uplink messages to one or more TRPs based on TAs signaled to the UE 115 as described herein, where the UE 115 is configured for NCJT. Accordingly, the UE 115 may transmit the one or more uplink messages within a single uplink CC, where each uplink message may have a TA associated with it.

Uplink transmissions 800 may indicate a single TA used for uplink messages to the one or more TRPs. For example, the one or more TRPs may have an ideal backhaul connection and, as such, may utilize the single TA. Accordingly, the UE 115 may first transmit a physical uplink channel (PUCH) (e.g., PUCCH or PUSCH) according to the single TA to a second TRP (e.g., TRP2). After the PUCH transmission is completed, the UE 115 may then transmit an SRS to a first TRP according to the single TA. Both the first and second TRP may dynamically coordinate so that the two uplink messages (e.g., PUCH and SRS) do not overlap in the time domain.

Alternatively, uplink transmissions 801 may illustrate an example where multiple TAs are used for corresponding uplink messages to the one or more TRPS. For example, the one or more TRPs may have a non-ideal backhaul connection and, as such, may utilize respective TAs for each TRP (e.g., indicated via separate TA indexes). Accordingly, the UE 115 may first be intended to transmit a PUCH to a second TRP according to a second TA. However, before the PUCH transmission is completed, the UE 115 may then be intended to transmit an SRS to a first TRP according to a first TA. As such, a misalignment may occur between the PUCH transmission and the SRS transmission, and a collision may occur between the two uplink transmissions.

To mitigate the collision, the UE 115 may follow a priority for the uplink transmissions and corresponding TAs, where an uplink transmission associated with a TA of a highest priority may be transmitted and the rest of the uplink transmissions are dropped. In some cases, the priority may be based on a master/slave TRP designation, where the UE 115 follows a TA command from a master TRP and affects (e.g., changes) transmission/reception of a slave TRP. Additionally or alternatively, the priority may be based on a semi-static configuration (e.g., via RRC signaling) that indicates a priority order among different TAs from different TRPs, and the UE 115 may follow a TA with a highest indicated priority. Additionally or alternatively, the priority may be based on a type of service associated with each uplink transmission and TA. For example, URLLC traffic may be prioritized over other uplink traffic, and a corresponding TA for the URLLC traffic may be prioritized over the other TAs. Additionally or alternatively, the priority may be based on when a TA command is received, where a latest received TA command may have a highest priority and the corresponding uplink transmission may be transmitted with the associated TA.

In some cases, the collision may be mitigated by transmitting the two uplink transmissions simultaneously via multiple antennas or antenna panels and applying no dropping. Accordingly, one uplink transmission may be sent per antenna or antenna panel. Additionally or alternatively, the UE 115 may spatially multiplex a first uplink transmission and a second uplink transmission in accordance with a spatial multiplexing configuration and simultaneously transmit the first uplink transmission and the second uplink transmission based on the spatial multiplexing configuration.

Figure 9:
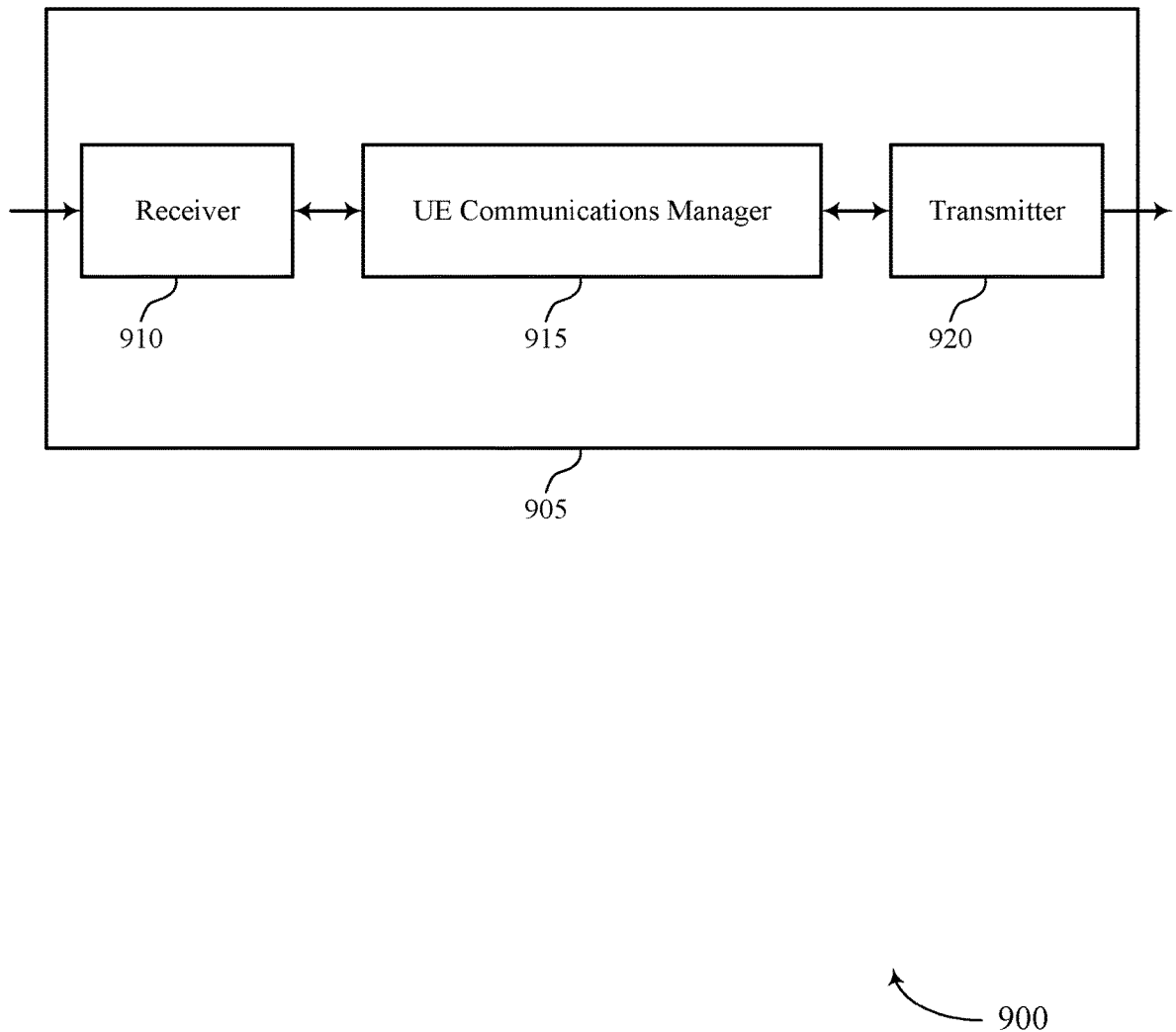
FIGS. 9 and 10 show block diagrams of devices that support a multiple TA design for multiple TRPs in accordance with aspects of the present disclosure.

FIG. 9 shows a block diagram 900 of a device 905 that supports multiple TA design for multiple TRPs in accordance with aspects of the present disclosure. The device 905 may be an example of aspects of a UE 115 as described herein. The device 905 may include a receiver 910, a UE communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to multiple TA design for multiple TRPs, etc.). Information may be passed on to other components of the device 905. The receiver 910 may be an example of aspects of the transceiver 1220 described with reference to FIG. 13. The receiver 910 may utilize a single antenna or a set of antennas.

The UE communications manager 915 may receive an indication of a TA index for a first uplink channel, the UE configured to communicate with a first TRP and a second TRP. Additionally, the UE communications manager 915 may determine, based on the received indication of the TA index, a TA for the first uplink channel. Accordingly, the UE communications manager 915 may transmit on the first uplink channel to the first TRP or the second TRP according to the determined TA. The UE communications manager 915 may be an example of aspects of the UE communications manager 1210 described herein.

The UE communications manager 915, or its sub-components, may be implemented in hardware, code (e.g., software or firmware) executed by a processor, or any combination thereof. If implemented in code executed by a processor, the functions of the UE communications manager 915, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The UE communications manager 915, or its sub-components, may be physically located at various positions, including being distributed such that portions of functions are implemented at different physical locations by one or more physical components. In some examples, the UE communications manager 915, or its sub-components, may be a separate and distinct component in accordance with various aspects of the present disclosure. In some examples, the UE communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 13. The transmitter 920 may utilize a single antenna or a set of antennas.

Figure 10:
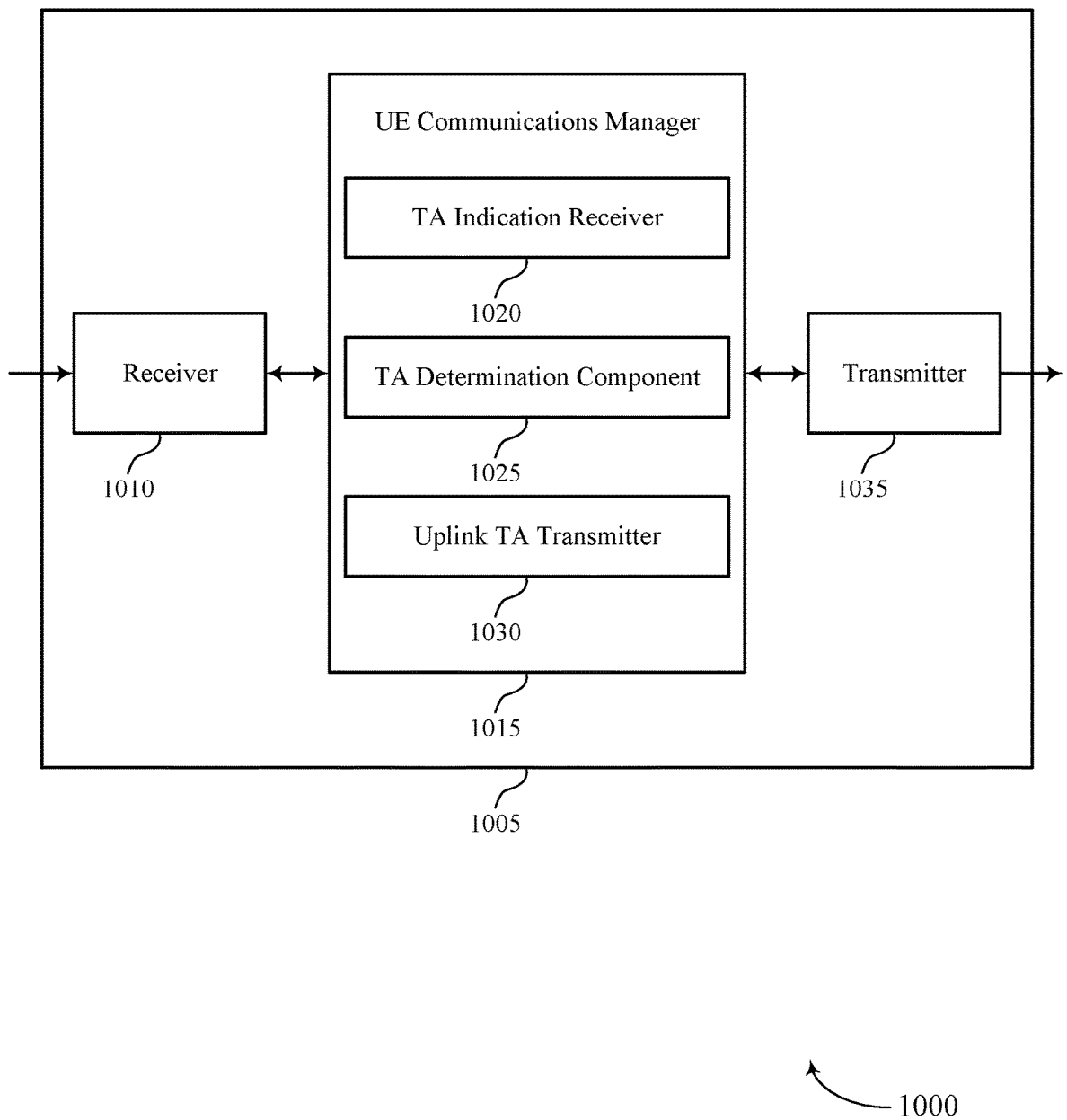

FIG. 10 shows a block diagram 1000 of a device 1005 that supports multiple TA design for multiple TRPs in accordance with aspects of the present disclosure. The device 1005 may be an example of aspects of a device 905 or a UE 115 as described herein. The device 1005 may include a receiver 1010, a UE communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to multiple TA design for multiple TRPs, etc.). Information may be passed on to other components of the device 1005. The receiver 1010 may be an example of aspects of the transceiver 1220 described with reference to FIG. 13. The receiver 1010 may utilize a single antenna or a set of antennas.

The UE communications manager 1015 may be an example of aspects of the UE communications manager 915 as described herein. The UE communications manager 1015 may include a TA indication receiver 1020, a TA determination component 1025, and an uplink TA transmitter 1030. The UE communications manager 1015 may be an example of aspects of the UE communications manager 1210 described herein.

The TA indication receiver 1020 may receive an indication of a TA index for a first uplink channel, the UE configured to communicate with a first TRP and a second TRP.

The TA determination component 1025 may determine, based on the received indication of the TA index, a TA for the first uplink channel.

The uplink TA transmitter 1030 may transmit on the first uplink channel to the first TRP or the second TRP according to the determined TA.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 13. The transmitter 1035 may utilize a single antenna or a set of antennas.

Figure 11:
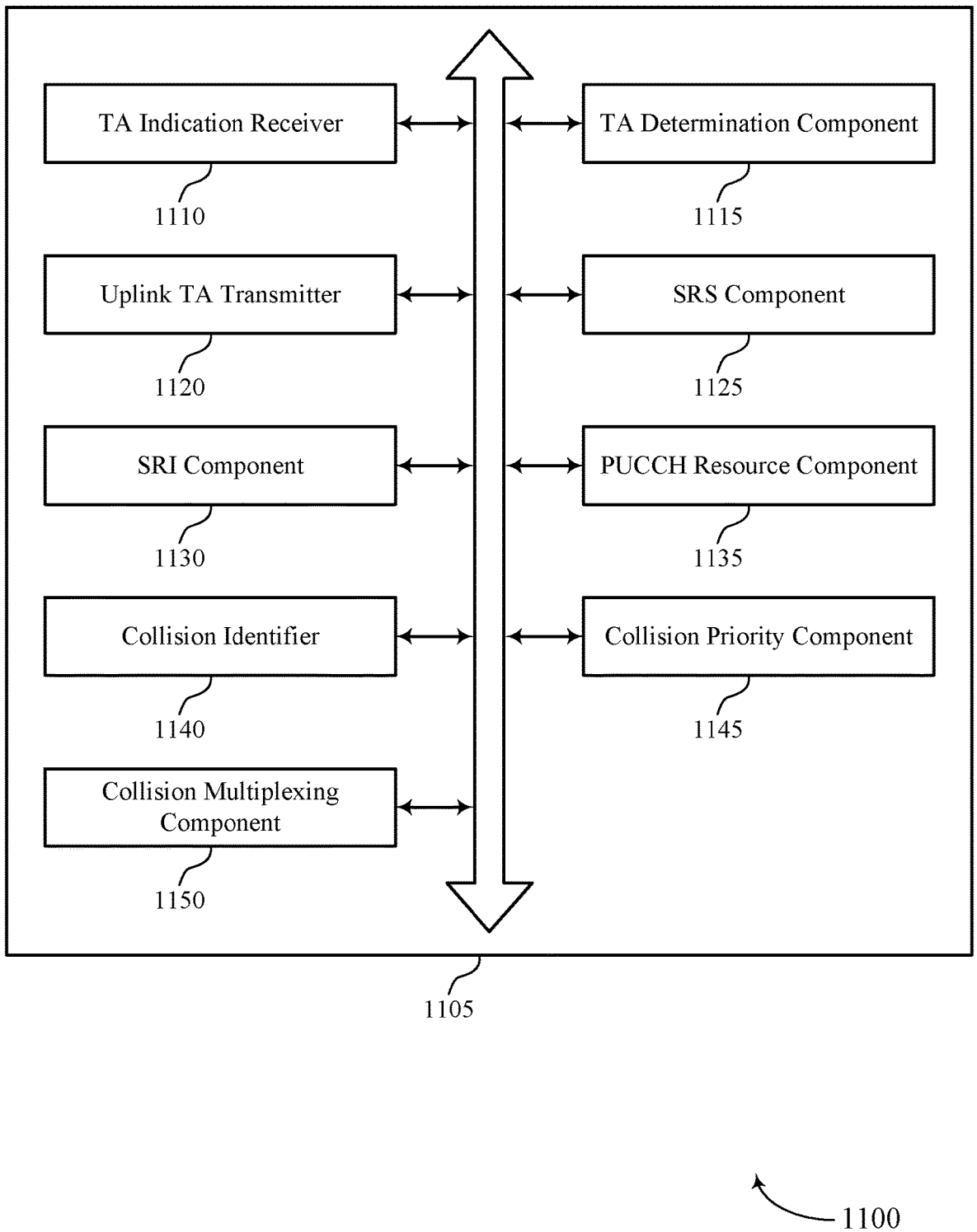
FIG. 11 shows a block diagram of a user equipment (UE) communications manager that supports a multiple TA design for multiple TRPs in accordance with aspects of the present disclosure.

FIG. 11 shows a block diagram 1100 of a UE communications manager 1105 that supports multiple TA design for multiple TRPs in accordance with aspects of the present disclosure. The UE communications manager 1105 may be an example of aspects of a UE communications manager 915, a UE communications manager 1015, or a UE communications manager 1210 described herein. The UE communications manager 1105 may include a TA indication receiver 1110, a TA determination component 1115, an uplink TA transmitter 1120, an SRS component 1125, an SRI component 1130, a PUCCH resource component 1135, a collision identifier 1140, a collision priority component 1145, and a collision multiplexing component 1150. Each of these modules may communicate, directly or indirectly, with one another (e.g., via one or more buses).

The TA indication receiver 1110 may receive an indication of a TA index for a first uplink channel, the UE configured to communicate with a first TRP and a second TRP.

The TA determination component 1115 may determine, based on the received indication of the TA index, a TA for the first uplink channel. Additionally or alternatively, the TA determination component 1115 may receive a first TA command for the first TRP and a second TA command for the second TRP. Accordingly, the TA determination component 1115 may identify that the UE is to transmit to the first TRP, where the TA for the first uplink channel is determined based on the first TA command by identifying that the UE is to transmit to the first TRP. In some cases, the TA determination component 1115 may identify that the UE is to transmit to the second TRP on a second uplink channel, where a second TA for the second uplink channel is determined based on a second TA command that includes a second TA index, and may transmit on the second uplink channel to the second TRP according to the second TA.

The uplink TA transmitter 1120 may transmit on the first uplink channel to the first TRP or the second TRP according to the determined TA. In some cases, the first uplink channel to the first TRP or the second TRP may include one of an SRS resource, or a PUSCH, or a PUCCH. Additionally, a second uplink channel to a different one of the first TRP or the second TRP includes a different one of the SRS resource, or the PUSCH, or the PUCCH. Alternatively, the second uplink channel to a different one of the first TRP or the second TRP may include a same one of the sounding reference signal resource, or the physical uplink shared channel, or the physical uplink control channel. In some cases, the UE may be configured to communicate with the first TRP and the second TRP in a same component carrier.

The SRS component 1125 may receive, via RRC signaling, an SRS resource or resource set configuration that includes the TA index.

The SRI component 1130 may receive an SRI. Accordingly, the SRI component 1130 may identify the TA index for the first uplink channel based on the received SRI. In some cases, the SRI is received in downlink control information.

The PUCCH resource component 1135 may receive, in RRC signaling, an uplink control channel resource configuration that includes the TA index.

The collision identifier 1140 may identify a collision between a first signal to be transmitted on the first uplink channel and a second signal to be transmitted on a second uplink channel.

The collision priority component 1145 may identify a priority between a first TA command for the first uplink channel and a second TA command for the second uplink channel. In some examples, the collision priority component 1145 may drop the first signal or the second signal based on the identified priority. In some examples, the collision priority component 1145 may prioritize the first TA command over the second TA command based on the first TA command being associated with a primary TRP, or a semi-static configuration indicating the priority, or a service associated with the first signal to be transmitted on the first uplink channel, or the first TA command having been received more recently than the second TA command, or a combination thereof.

The collision multiplexing component 1150 may spatially multiplex the first uplink channel and the second uplink channel in accordance with a spatial multiplexing configuration based on identifying the collision between the first signal and the second signal. In some examples, the collision multiplexing component 1150 may simultaneously transmit the first signal and the second signal on the spatially multiplexed uplink channel and second uplink channel.

Figure 12:
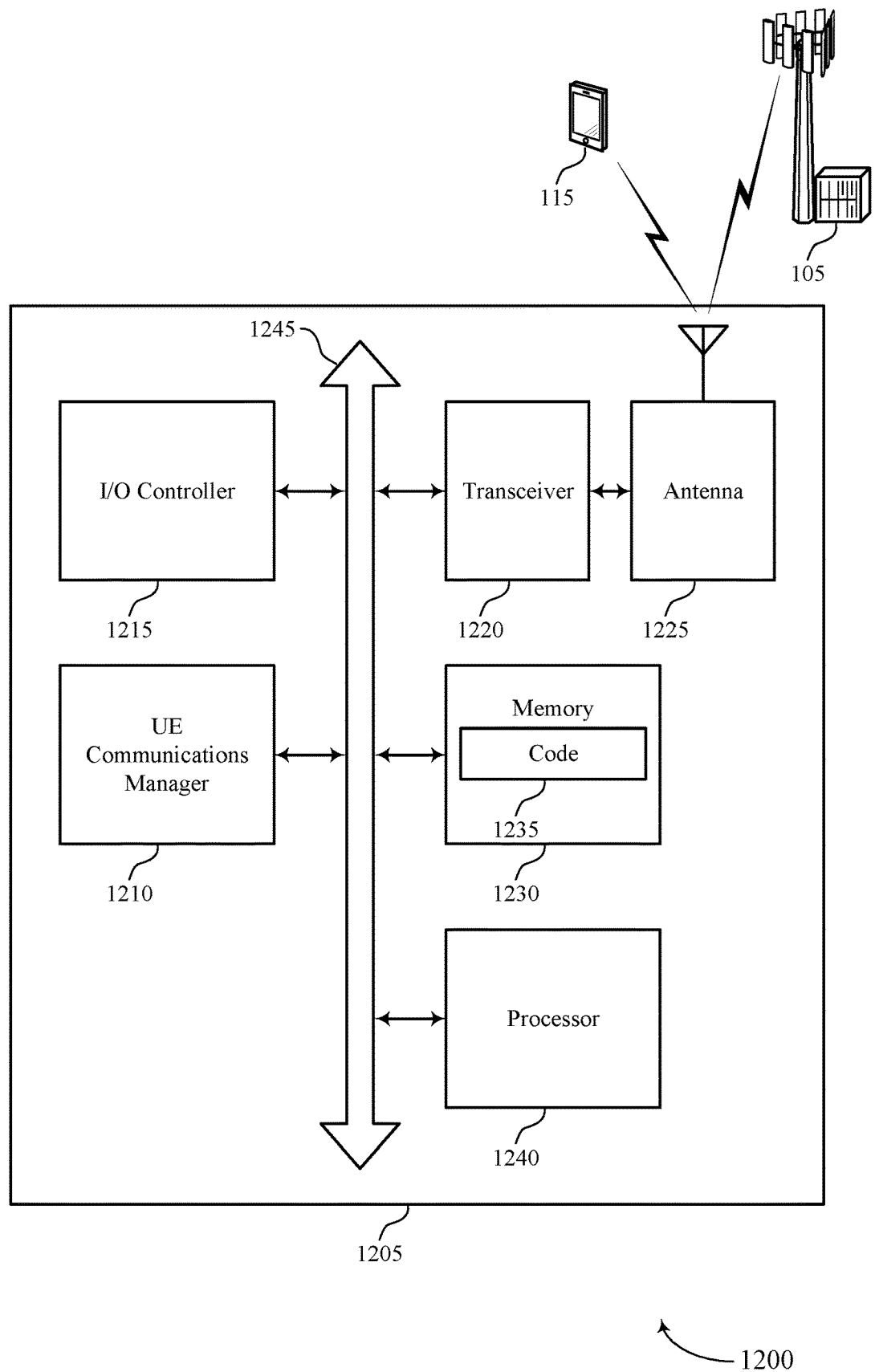
FIG. 12 shows a diagram of a system including a device that supports a multiple TA design for multiple TRPs in accordance with aspects of the present disclosure.

FIG. 12 shows a diagram of a system 1200 including a device 1205 that supports multiple TA design for multiple TRPs in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a UE communications manager 1210, an I/O controller 1215, a transceiver 1220, an antenna 1225, memory 1230, and a processor 1240. These components may be in electronic communication via one or more buses (e.g., bus 1245).

The UE communications manager 1210 may receive an indication of a TA index for a first uplink channel, the UE configured to communicate with a first TRP and a second TRP. Additionally, the UE communications manager 1210 may determine, based on the received indication of the TA index, a TA for the first uplink channel. Accordingly, the UE communications manager 1210 may transmit on the first uplink channel to the first TRP or the second TRP according to the determined TA.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic I/O system (BIOS) which may control basic hardware or software operation such as the interaction with peripheral components or devices.

The processor 1240 may include an intelligent hardware device, (e.g., a general-purpose processor, a DSP, a central processing unit (CPU), a microcontroller, an ASIC, an FPGA, a PLD, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting multiple TA design for multiple TRPs).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
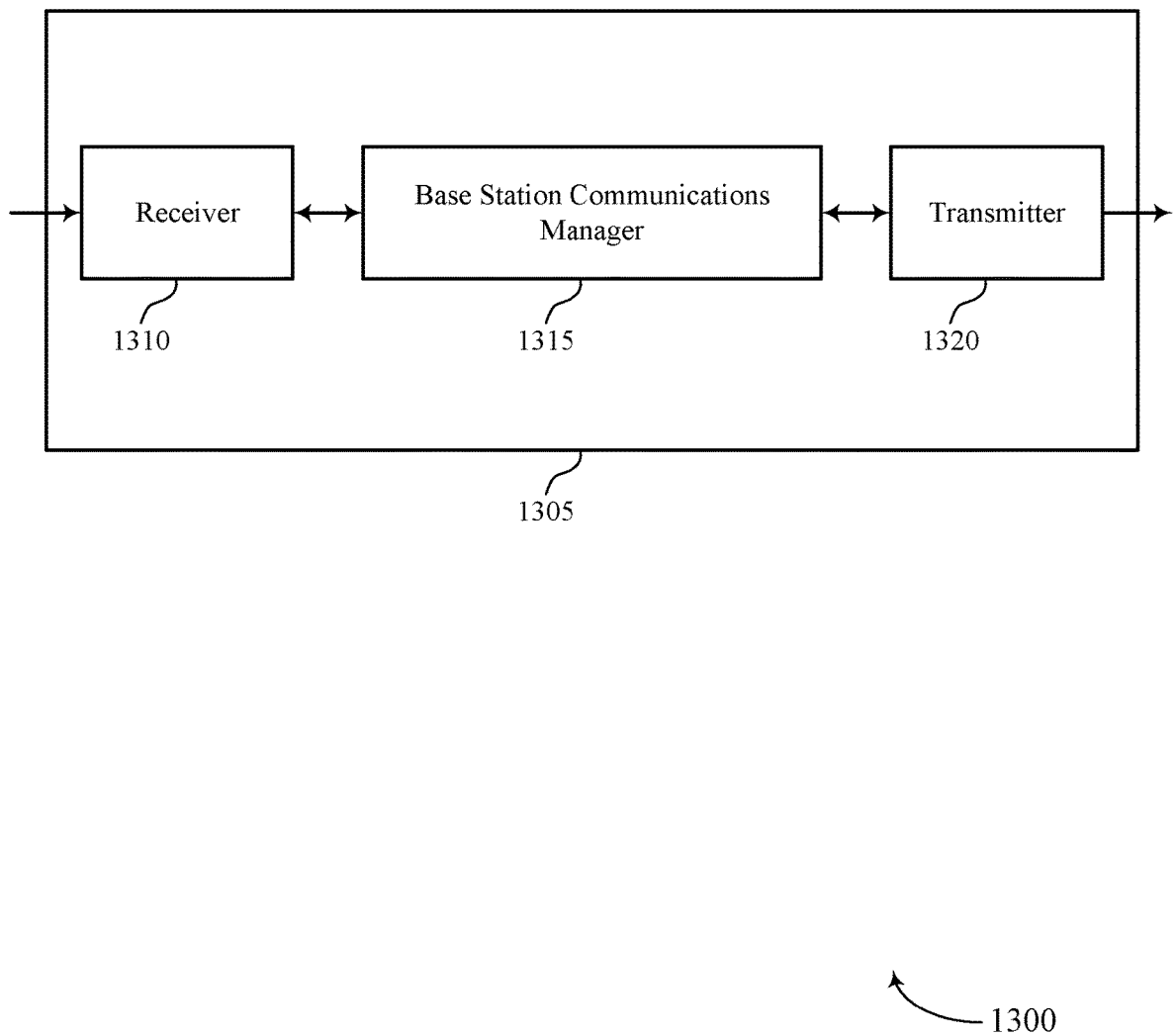
FIGS. 13 and 14 show block diagrams of devices that support a multiple TA design for multiple TRPs in accordance with aspects of the present disclosure.

FIG. 13 shows a block diagram 1300 of a device 1305 that supports multiple TA design for multiple TRPs in accordance with aspects of the present disclosure. The device 1305 may be an example of aspects of a base station 105 or TRP as described herein. The device 1305 may include a receiver 1310, a base station communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to multiple TA design for multiple TRPs, etc.). Information may be passed on to other components of the device 1305. The receiver 1310 may be an example of aspects of the transceiver 1720 described with reference to FIG. 17. The receiver 1310 may utilize a single antenna or a set of antennas.

The base station communications manager 1315 may identify a configuration for a UE to communicate with a first TRP at the base station and a second TRP. In some cases, the base station communications manager 1315 may transmit, to the UE based on the identified configuration, an indication of a TA index for a first uplink channel to the first TRP or the second TRP, the TA index to be used by the UE to determine a TA for the first uplink channel. The base station communications manager 1315 may be an example of aspects of the base station communications manager 1710 described herein.

The base station communications manager 1315, or its sub-components, may be implemented in hardware, code (e.g., software or firmware) executed by a processor, or any combination thereof. If implemented in code executed by a processor, the functions of the base station communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1315, or its sub-components, may be physically located at various positions, including being distributed such that portions of functions are implemented at different physical locations by one or more physical components. In some examples, the base station communications manager 1315, or its sub-components, may be a separate and distinct component in accordance with various aspects of the present disclosure. In some examples, the base station communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1720 described with reference to FIG. 17. The transmitter 1320 may utilize a single antenna or a set of antennas.

Figure 14:
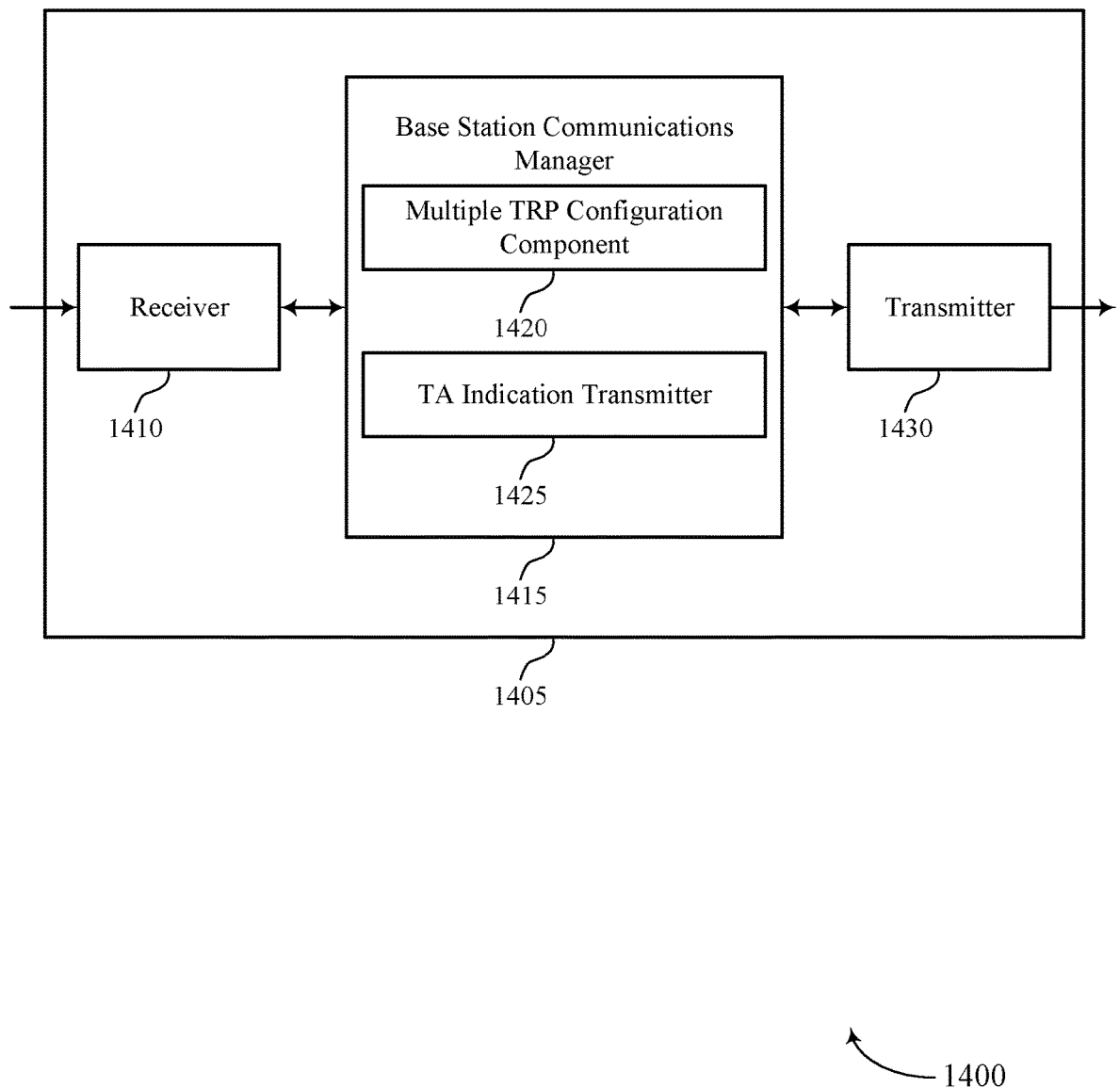

FIG. 14 shows a block diagram 1400 of a device 1405 that supports multiple TA design for multiple TRPs in accordance with aspects of the present disclosure. The device 1405 may be an example of aspects of a device 1305 or a base station 105 or TRP as described herein. The device 1405 may include a receiver 1410, a base station communications manager 1415, and a transmitter 1430. The device 1405 may also include a processor. Each of these components may be in communication with one another (e.g., via one or more buses).

The receiver 1410 may receive information such as packets, user data, or control information associated with various information channels (e.g., control channels, data channels, and information related to multiple TA design for multiple TRPs, etc.). Information may be passed on to other components of the device 1405. The receiver 1410 may be an example of aspects of the transceiver 1720 described with reference to FIG. 17. The receiver 1410 may utilize a single antenna or a set of antennas.

The base station communications manager 1415 may be an example of aspects of the base station communications manager 1315 as described herein. The base station communications manager 1415 may include a multiple TRP configuration component 1420 and a TA indication transmitter 1425. The base station communications manager 1415 may be an example of aspects of the base station communications manager 1710 described herein.

The multiple TRP configuration component 1420 may identify a configuration for a UE to communicate with a first TRP at the base station and a second TRP.

The TA indication transmitter 1425 may transmit, to the UE based on the identified configuration, an indication of a TA index for a first uplink channel to the first TRP or the second TRP, the TA index to be used by the UE to determine a TA for the first uplink channel.

The transmitter 1430 may transmit signals generated by other components of the device 1405. In some examples, the transmitter 1430 may be collocated with a receiver 1410 in a transceiver module. For example, the transmitter 1430 may be an example of aspects of the transceiver 1720 described with reference to FIG. 17. The transmitter 1430 may utilize a single antenna or a set of antennas.

Figure 15:
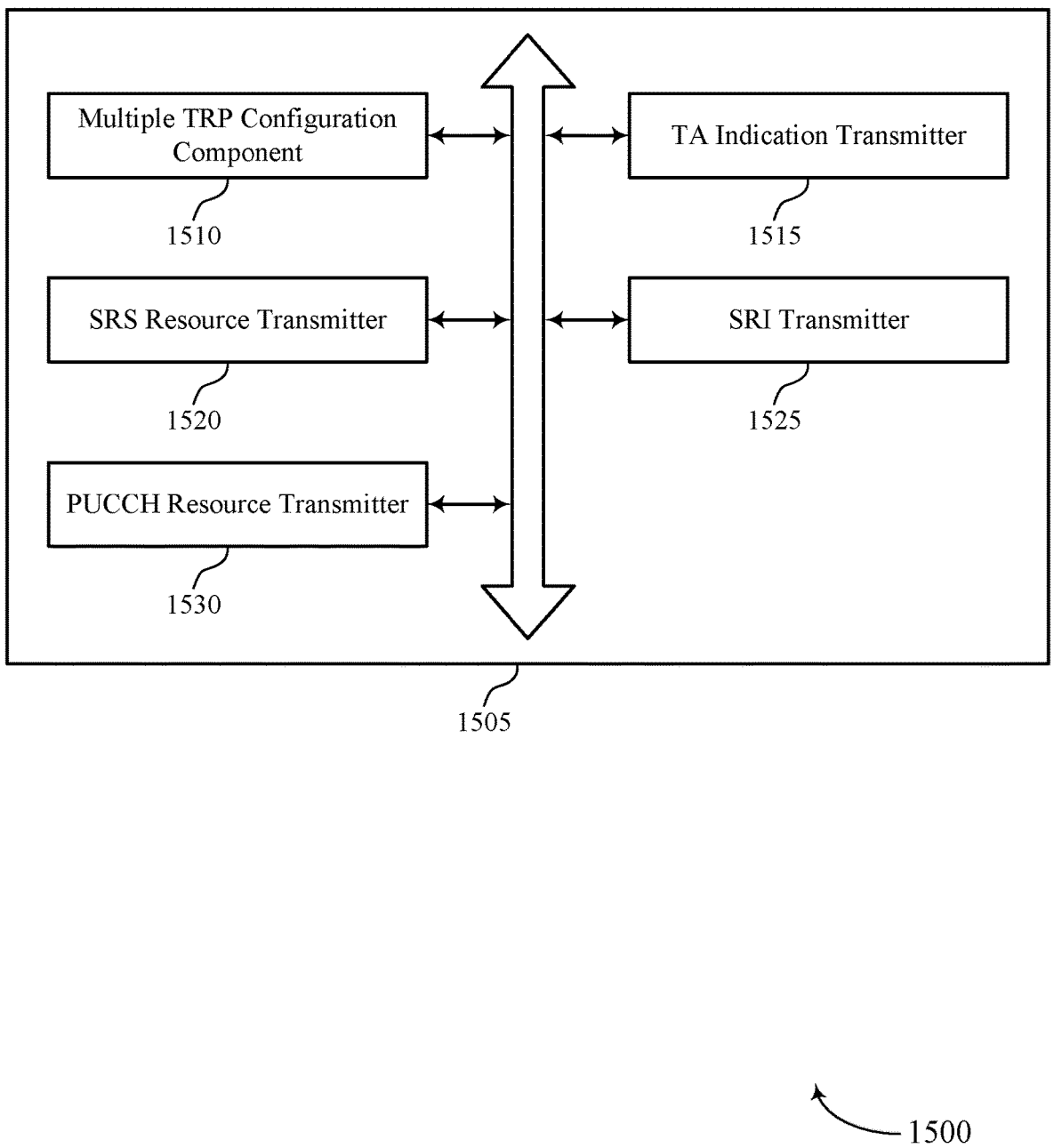
FIG. 15 shows a block diagram of a base station communications manager that supports a multiple TA design for multiple TRPs in accordance with aspects of the present disclosure.

FIG. 15 shows a block diagram 1500 of a base station communications manager 1505 that supports multiple TA design for multiple TRPs in accordance with aspects of the present disclosure. The base station communications manager 1505 may be an example of aspects of a base station communications manager 1315, a base station communications manager 1415, or a base station communications manager 1710 described herein. The base station communications manager 1505 may include a multiple TRP configuration component 1510, a TA indication transmitter 1515, an SRS resource transmitter 1520, an SRI transmitter 1525, and a PUCCH resource transmitter 1530. Each of these modules may communicate, directly or indirectly, with one another (e.g., via one or more buses).

The multiple TRP configuration component 1510 may identify a configuration for a UE to communicate with a first TRP at the base station and a second TRP.

The TA indication transmitter 1515 may transmit, to the UE based on the identified configuration, an indication of a TA index for a first uplink channel to the first TRP or the second TRP, the TA index to be used by the UE to determine a TA for the first uplink channel. In some cases, the first uplink channel to the first TRP or the second TRP may include an SRS resource, or a PUSCH, or a PUCCH. Additionally, a second uplink channel to a different one of the first TRP or the second TRP may include a different one of the SRS resource, or the PUSCH, or the PUCCH. Alternatively, the second uplink channel to a different one of the first TRP or the second TRP may include a same one of the SRS resource, or the PUSCH, or the PUCCH. In some cases, the TA indication transmitter 1515 may transmit, to the UE based on the identified configuration, an indication of a second TA index for a second uplink channel to the second TRP, the second TA index associated with a TA for the second uplink channel 1.

The SRS resource transmitter 1520 may transmit, via RRC signaling, an SRS resource or resource set configuration that includes the TA index.

The SRI transmitter 1525 may identify the TA index for the first uplink channel. In some examples, the SRI transmitter 1525 may transmit an SRI that indicates the TA index. In some cases, the SRI may be transmitted in DCI.

The PUCCH resource transmitter 1530 may transmit, via RRC signaling, an uplink control channel resource configuration that includes the TA index.

Figure 16:
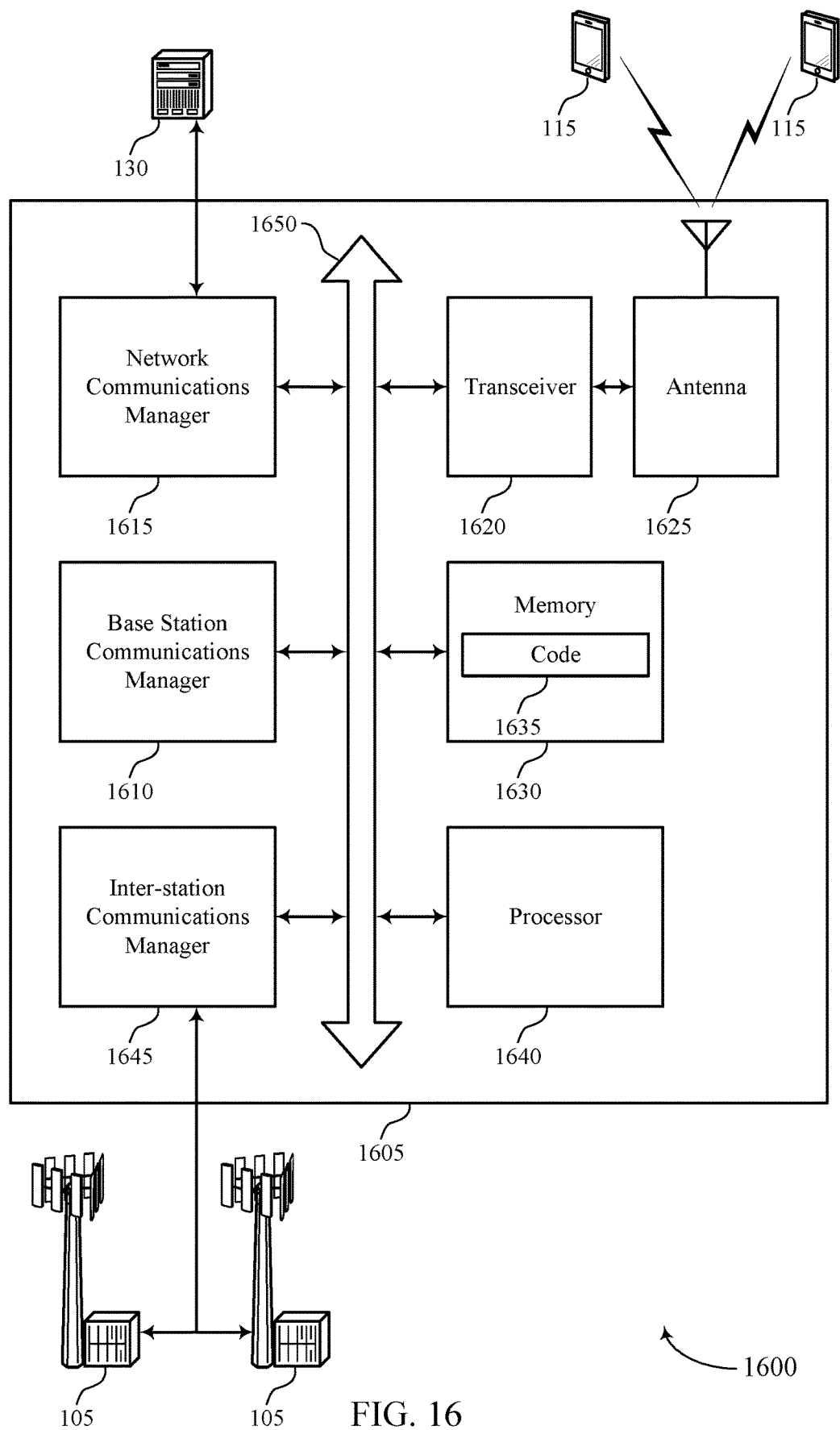
FIG. 16 shows a diagram of a system including a device that supports a multiple TA design for multiple TRPs in accordance with aspects of the present disclosure.

FIG. 16 shows a diagram of a system 1600 including a device 1605 that supports multiple TA design for multiple TRPs in accordance with aspects of the present disclosure. The device 1605 may be an example of or include the components of device 1305, device 1405, a base station 105, or a TRP as described herein. The device 1605 may include components for bi-directional voice and data communications including components for transmitting and receiving communications, including a base station communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The base station communications manager 1610 may identify a configuration for a UE to communicate with a first TRP at the base station and a second TRP. In some cases, the base station communications manager 1610 may transmit, to the UE based on the identified configuration, an indication of a TA index for a first uplink channel to the first TRP or the second TRP, the TA index to be used by the UE to determine a TA for the first uplink channel.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a PLD, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1705 to perform various functions (e.g., functions or tasks supporting multiple TA design for multiple TRPs).

The inter-station communications manager 1645 may manage communications with other base station 105 and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
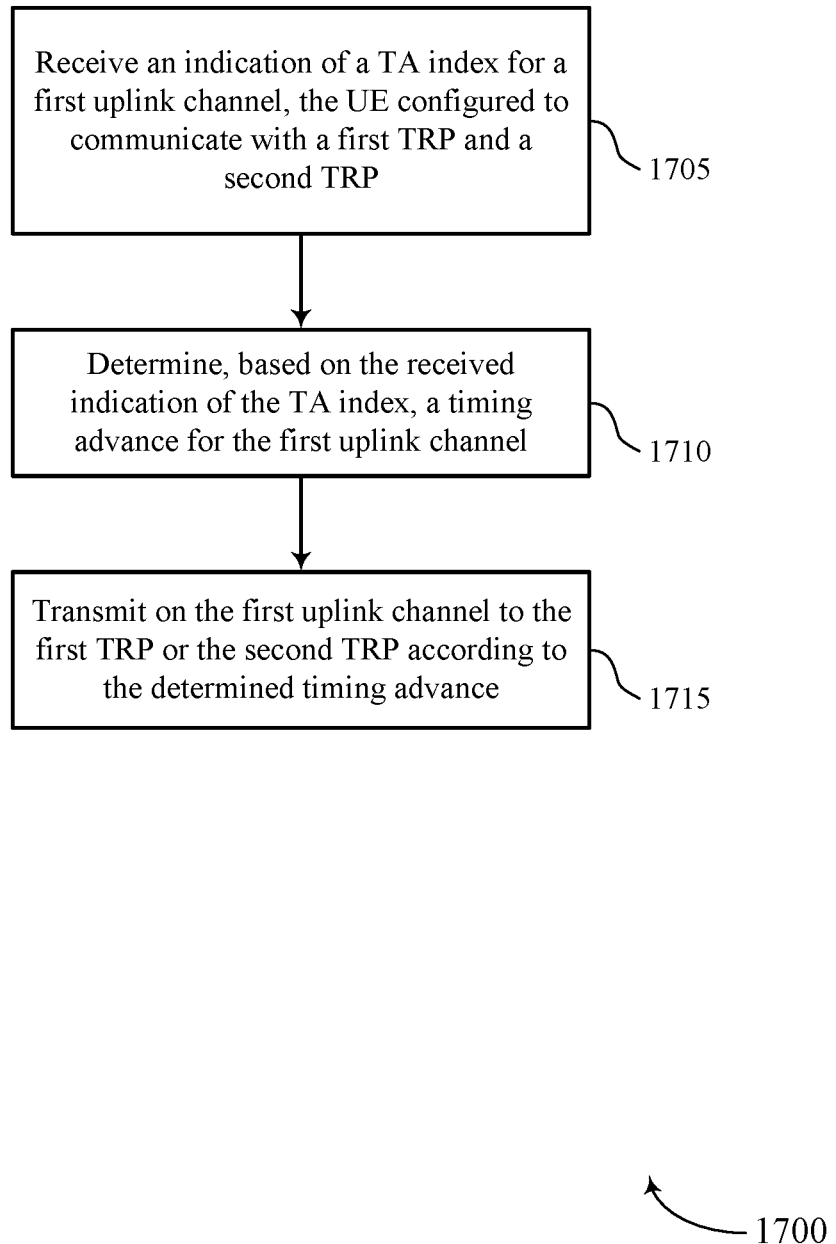
FIGS. 17 through 24 show flowcharts illustrating methods that support a multiple TA design for multiple TRPs in accordance with aspects of the present disclosure.

FIG. 17 shows a flowchart illustrating a method 1700 that supports multiple TA design for multiple TRPs in accordance with aspects of the present disclosure. The operations of method 1700 may be implemented by a UE 115 or its components as described herein. For example, the operations of method 1700 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1705, the UE may receive an indication of a TA index for a first uplink channel, the UE configured to communicate with a first TRP and a second TRP. The operations of 1705 may be performed according to the methods described herein. In some examples, aspects of the operations of 1705 may be performed by a TA indication receiver as described with reference to FIGS. 9 through 12.

At 1710, the UE may determine, based on the received indication of the TA index, a TA for the first uplink channel. The operations of 1710 may be performed according to the methods described herein. In some examples, aspects of the operations of 1710 may be performed by a TA determination component as described with reference to FIGS. 9 through 12.

At 1715, the UE may transmit on the first uplink channel to the first TRP or the second TRP according to the determined TA. The operations of 1715 may be performed according to the methods described herein. In some examples, aspects of the operations of 1715 may be performed by an uplink TA transmitter as described with reference to FIGS. 9 through 12.

Figure 18:
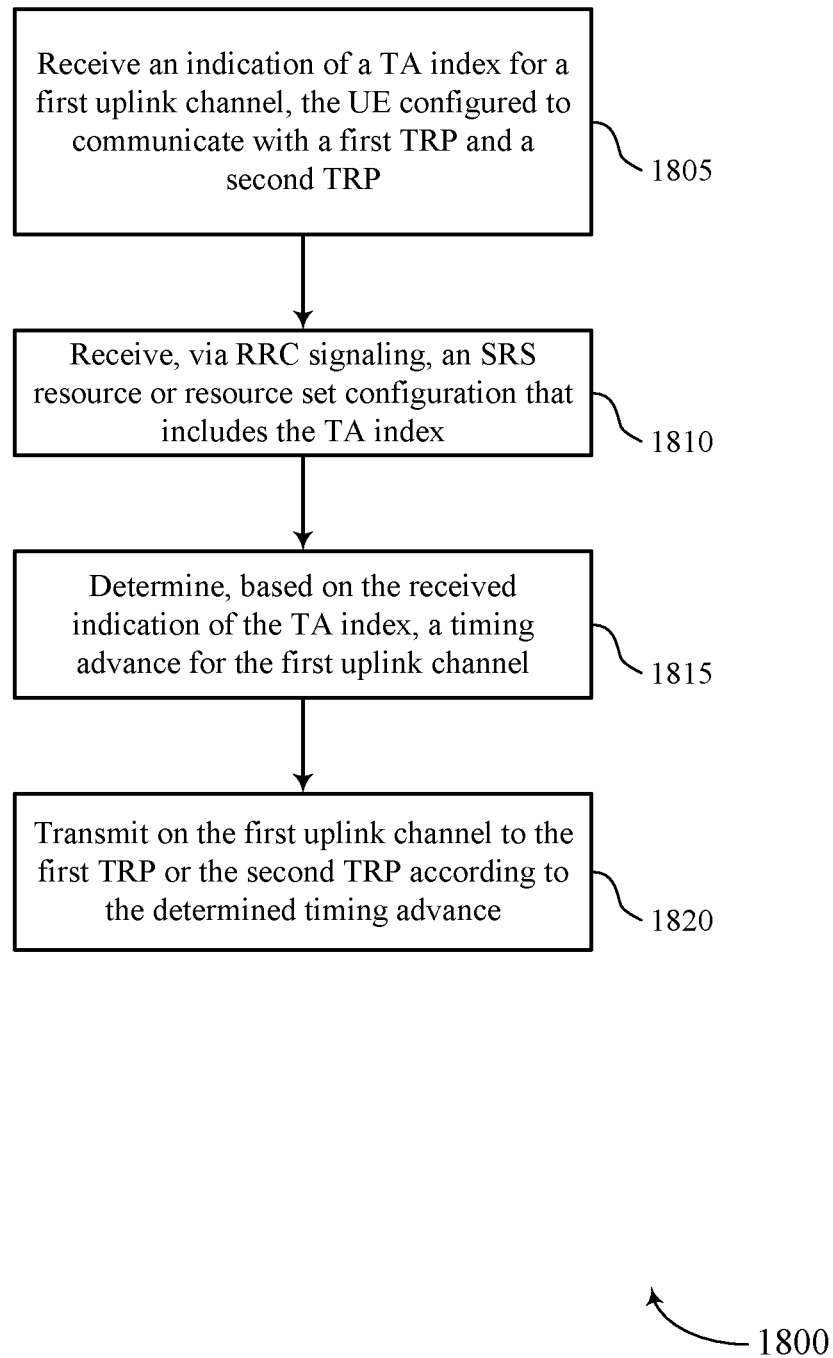

FIG. 18 shows a flowchart illustrating a method 1800 that supports multiple TA design for multiple TRPs in accordance with aspects of the present disclosure. The operations of method 1800 may be implemented by a UE 115 or its components as described herein. For example, the operations of method 1800 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1805, the UE may receive an indication of a TA index for a first uplink channel, the UE configured to communicate with a first TRP and a second TRP. The operations of 1805 may be performed according to the methods described herein. In some examples, aspects of the operations of 1805 may be performed by a TA indication receiver as described with reference to FIGS. 9 through 12.

At 1810, the UE may receive, via RRC signaling, an SRS resource or resource set configuration that includes the TA index. The operations of 1810 may be performed according to the methods described herein. In some examples, aspects of the operations of 1810 may be performed by an SRS component as described with reference to FIGS. 9 through 12.

At 1815, the UE may determine, based on the received indication of the TA index, a TA for the first uplink channel. The operations of 1815 may be performed according to the methods described herein. In some examples, aspects of the operations of 1815 may be performed by a TA determination component as described with reference to FIGS. 9 through 12.

At 1820, the UE may transmit on the first uplink channel to the first TRP or the second TRP according to the determined TA. The operations of 1820 may be performed according to the methods described herein. In some examples, aspects of the operations of 1820 may be performed by an uplink TA transmitter as described with reference to FIGS. 9 through 12.

Figure 19:
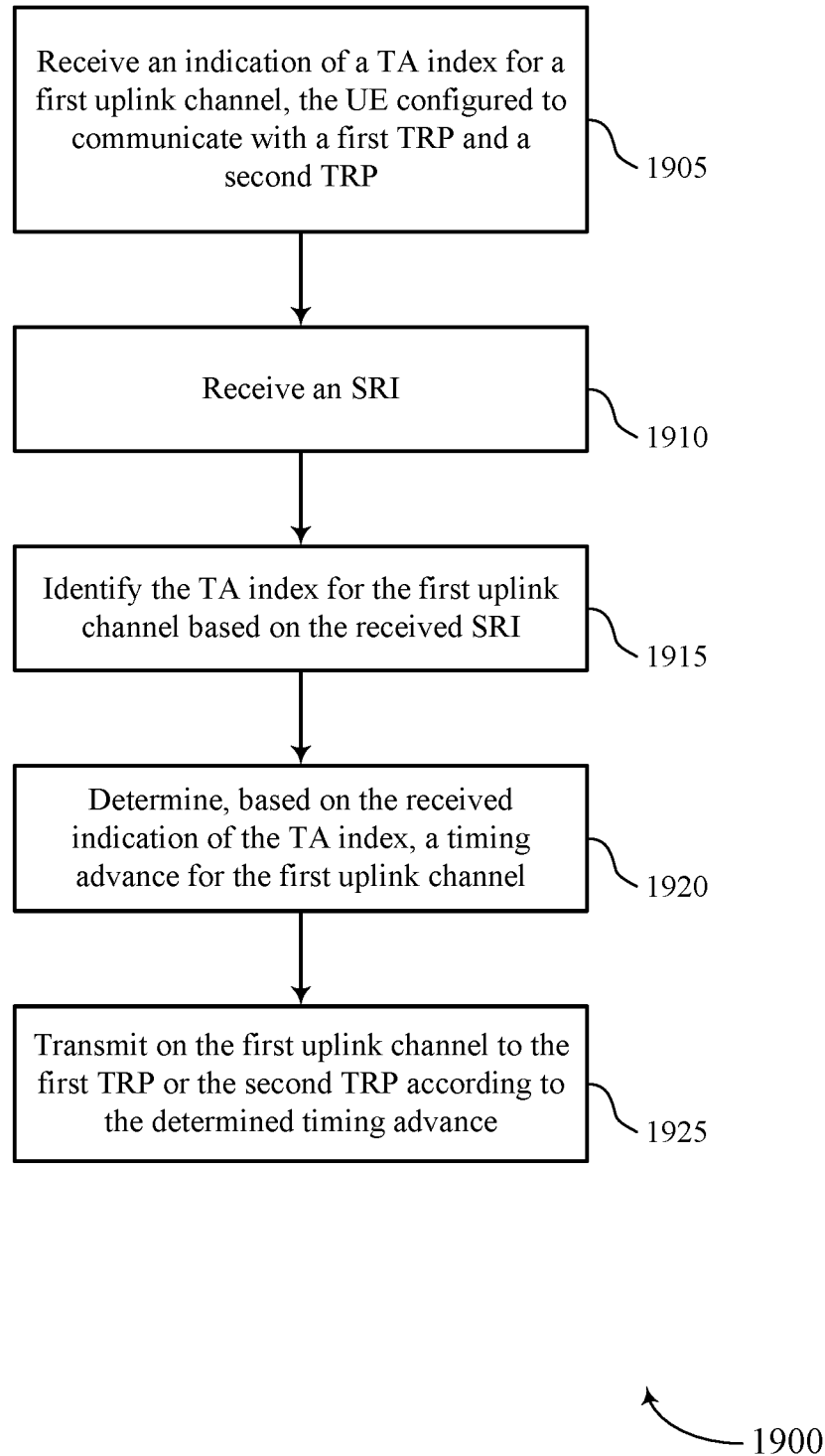

FIG. 19 shows a flowchart illustrating a method 1900 that supports multiple TA design for multiple TRPs in accordance with aspects of the present disclosure. The operations of method 1900 may be implemented by a UE 115 or its components as described herein. For example, the operations of method 1900 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1905, the UE may receive an indication of a TA index for a first uplink channel, the UE configured to communicate with a first TRP and a second TRP. The operations of 1905 may be performed according to the methods described herein. In some examples, aspects of the operations of 1905 may be performed by a TA indication receiver as described with reference to FIGS. 9 through 12.

At 1910, the UE may receive an SRI. The operations of 1910 may be performed according to the methods described herein. In some examples, aspects of the operations of 1910 may be performed by an SRI component as described with reference to FIGS. 9 through 12.

At 1915, the UE may identify the TA index for the first uplink channel based on the received SRI. The operations of 1915 may be performed according to the methods described herein. In some examples, aspects of the operations of 1915 may be performed by an SRI component as described with reference to FIGS. 9 through 12.

At 1920, the UE may determine, based on the received indication of the TA index, a TA for the first uplink channel. The operations of 1920 may be performed according to the methods described herein. In some examples, aspects of the operations of 1920 may be performed by a TA determination component as described with reference to FIGS. 9 through 12.

At 1925, the UE may transmit on the first uplink channel to the first TRP or the second TRP according to the determined TA. The operations of 1925 may be performed according to the methods described herein. In some examples, aspects of the operations of 1925 may be performed by an uplink TA transmitter as described with reference to FIGS. 9 through 12.

Figure 20:
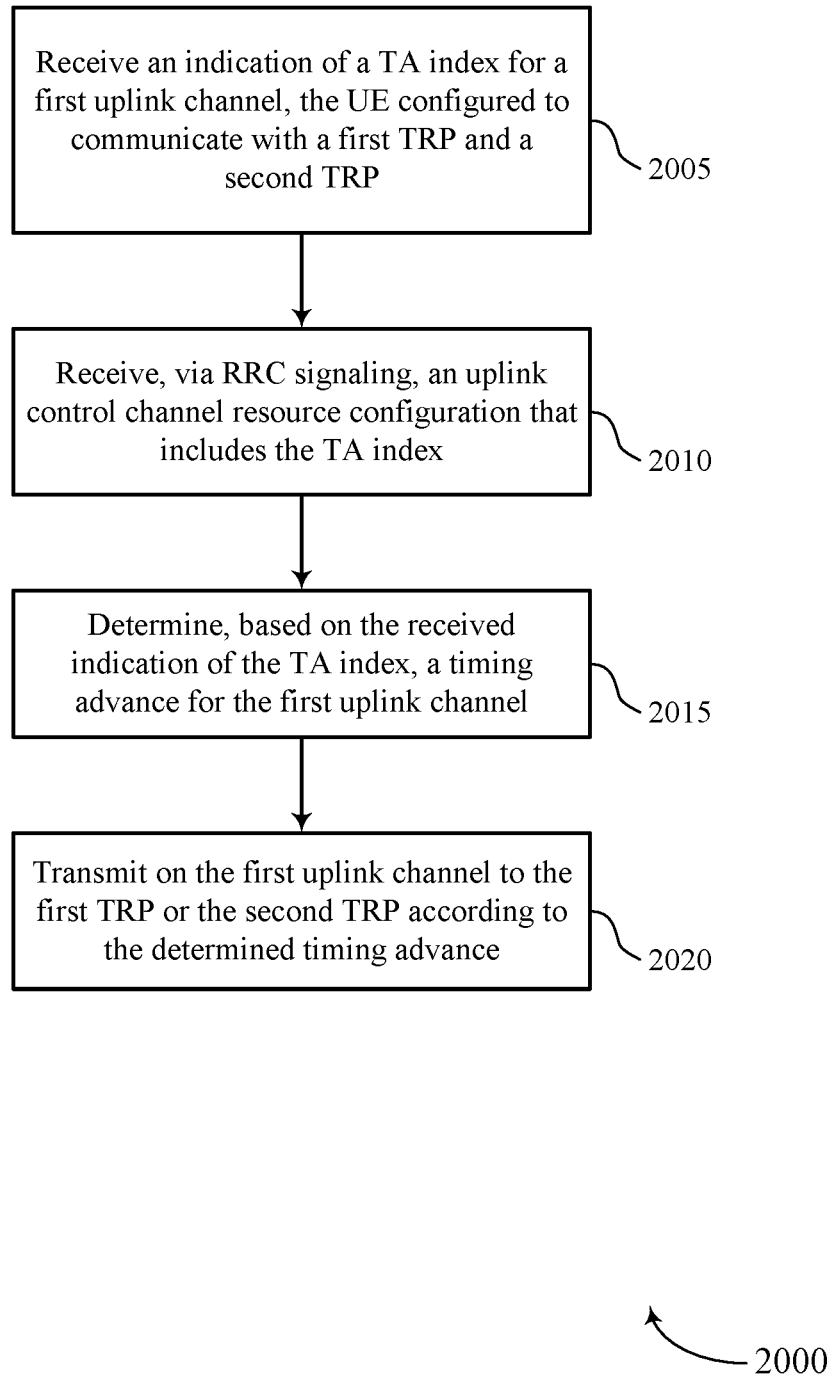

FIG. 20 shows a flowchart illustrating a method 2000 that supports multiple TA design for multiple TRPs in accordance with aspects of the present disclosure. The operations of method 2000 may be implemented by a UE 115 or its components as described herein. For example, the operations of method 2000 may be performed by a UE communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 2005, the UE may receive an indication of a TA index for a first uplink channel, the UE configured to communicate with a first TRP and a second TRP. The operations of 2005 may be performed according to the methods described herein. In some examples, aspects of the operations of 2005 may be performed by a TA indication receiver as described with reference to FIGS. 9 through 12.

At 2010, the UE may receive, via RRC signaling, an uplink control channel resource configuration that includes the TA index. The operations of 2010 may be performed according to the methods described herein. In some examples, aspects of the operations of 2010 may be performed by a PUCCH resource component as described with reference to FIGS. 9 through 12.

At 2015, the UE may determine, based on the received indication of the TA index, a TA for the first uplink channel. The operations of 2015 may be performed according to the methods described herein. In some examples, aspects of the operations of 2015 may be performed by a TA determination component as described with reference to FIGS. 9 through 12.

At 2020, the UE may transmit on the first uplink channel to the first TRP or the second TRP according to the determined TA. The operations of 2020 may be performed according to the methods described herein. In some examples, aspects of the operations of 2020 may be performed by an uplink TA transmitter as described with reference to FIGS. 9 through 12.

Figure 21:
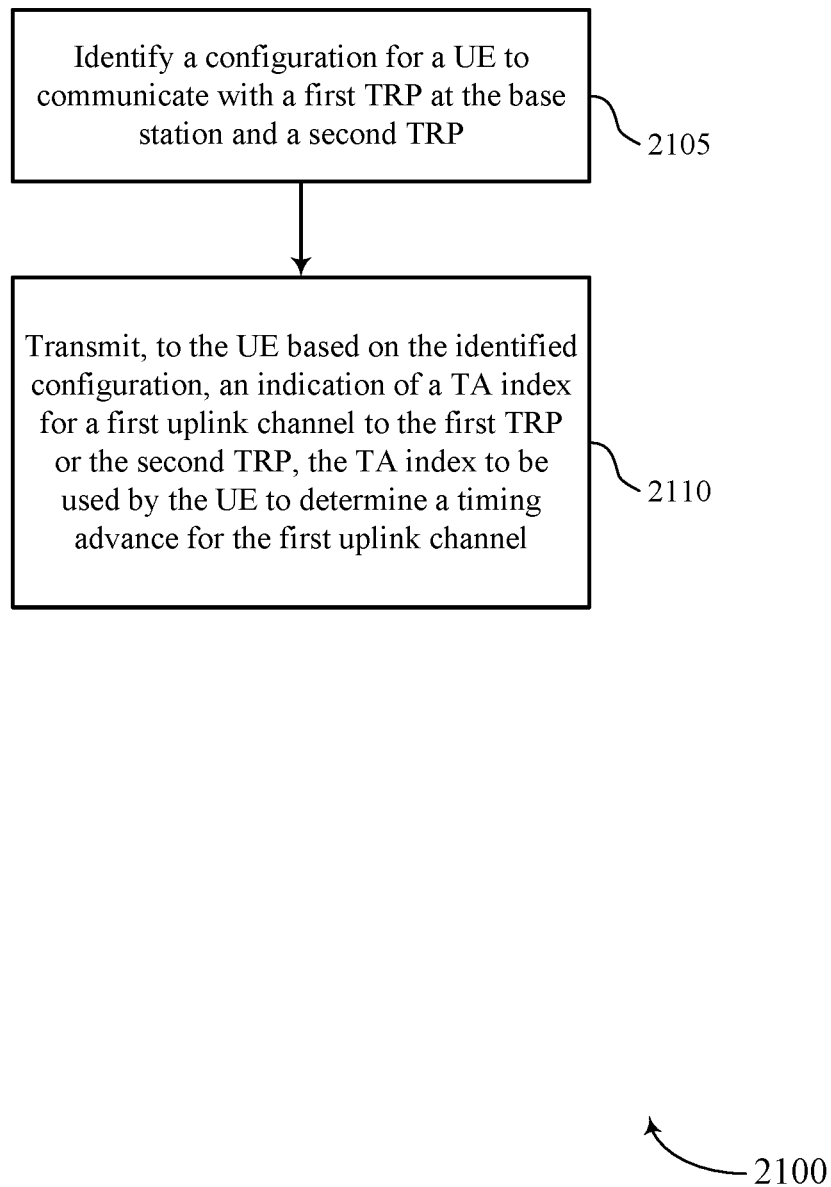

FIG. 21 shows a flowchart illustrating a method 2100 that supports multiple TA design for multiple TRPs in accordance with aspects of the present disclosure. The operations of method 2100 may be implemented by a base station 105, or a TRP, or its components as described herein. For example, the operations of method 2100 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2105, the base station may identify a configuration for a UE to communicate with a first TRP at the base station and a second TRP. The operations of 2105 may be performed according to the methods described herein. In some examples, aspects of the operations of 2105 may be performed by a multiple TRP configuration component as described with reference to FIGS. 13 through 16.

At 2110, the base station may transmit, to the UE based on the identified configuration, an indication of a TA index for a first uplink channel to the first TRP or the second TRP, the TA index to be used by the UE to determine a TA for the first uplink channel. The operations of 2110 may be performed according to the methods described herein. In some examples, aspects of the operations of 2110 may be performed by a TA indication transmitter as described with reference to FIGS. 13 through 16.

Figure 22:
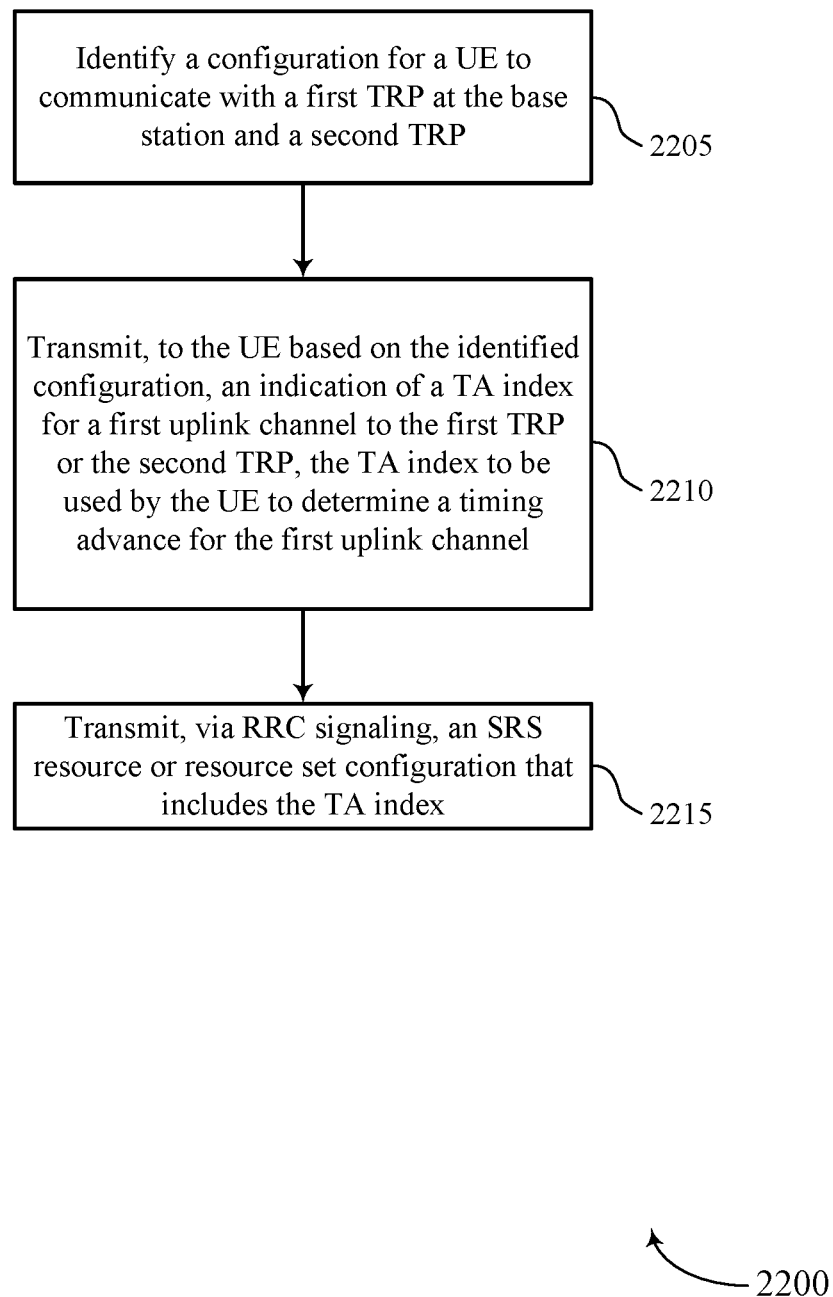

FIG. 22 shows a flowchart illustrating a method 2200 that supports multiple TA design for multiple TRPs in accordance with aspects of the present disclosure. The operations of method 2200 may be implemented by a base station 105, or a TRP, or its components as described herein. For example, the operations of method 2200 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2205, the base station may identify a configuration for a UE to communicate with a first TRP at the base station and a second TRP. The operations of 2205 may be performed according to the methods described herein. In some examples, aspects of the operations of 2205 may be performed by a multiple TRP configuration component as described with reference to FIGS. 13 through 16.

At 2210, the base station may transmit, to the UE based on the identified configuration, an indication of a TA index for a first uplink channel to the first TRP or the second TRP, the TA index to be used by the UE to determine a TA for the first uplink channel. The operations of 2210 may be performed according to the methods described herein. In some examples, aspects of the operations of 2210 may be performed by a TA indication transmitter as described with reference to FIGS. 13 through 16.

At 2215, the base station may transmit, via RRC signaling, an SRS resource or resource set configuration that includes a TA index. The operations of 2215 may be performed according to the methods described herein. In some examples, aspects of the operations of 2215 may be performed by an SRS resource transmitter as described with reference to FIGS. 13 through 16.

Figure 23:
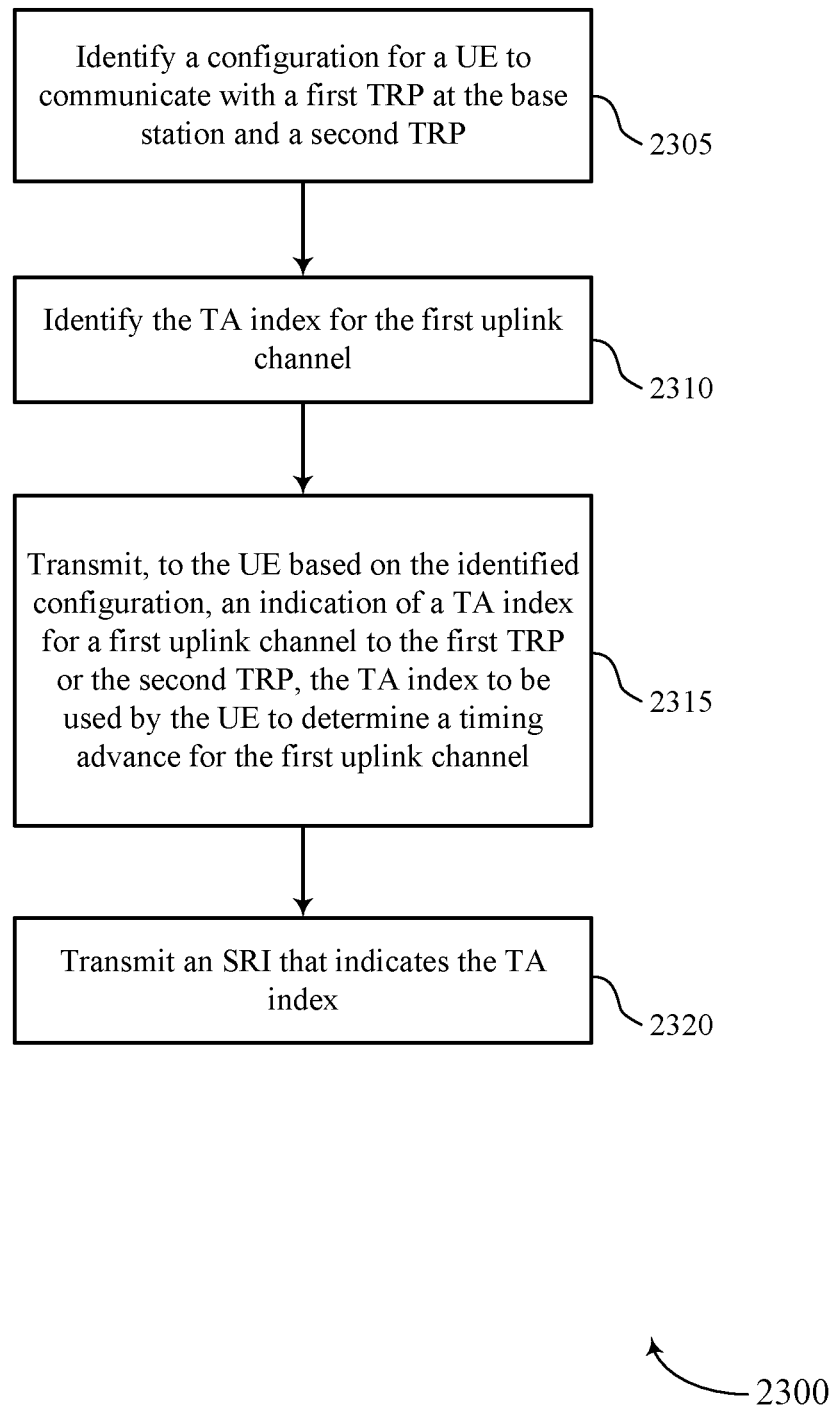

FIG. 23 shows a flowchart illustrating a method 2300 that supports multiple TA design for multiple TRPs in accordance with aspects of the present disclosure. The operations of method 2300 may be implemented by a base station 105, or a TRP, or its components as described herein. For example, the operations of method 2300 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2305, the base station may identify a configuration for a UE to communicate with a first TRP at the base station and a second TRP. The operations of 2305 may be performed according to the methods described herein. In some examples, aspects of the operations of 2305 may be performed by a multiple TRP configuration component as described with reference to FIGS. 13 through 16.

At 2310, the base station may identify a TA index for the first uplink channel. The operations of 2310 may be performed according to the methods described herein. In some examples, aspects of the operations of 2310 may be performed by an SRI transmitter as described with reference to FIGS. 13 through 16.

At 2315, the base station may transmit, to the UE based on the identified configuration, an indication of the TA index for a first uplink channel to the first TRP or the second TRP, the TA index to be used by the UE to determine a TA for the first uplink channel. The operations of 2315 may be performed according to the methods described herein. In some examples, aspects of the operations of 2315 may be performed by a TA indication transmitter as described with reference to FIGS. 13 through 16.

At 2320, the base station may transmit an SRI that indicates the TA index. The operations of 2320 may be performed according to the methods described herein. In some examples, aspects of the operations of 2320 may be performed by an SRI transmitter as described with reference to FIGS. 13 through 16.

Figure 24:
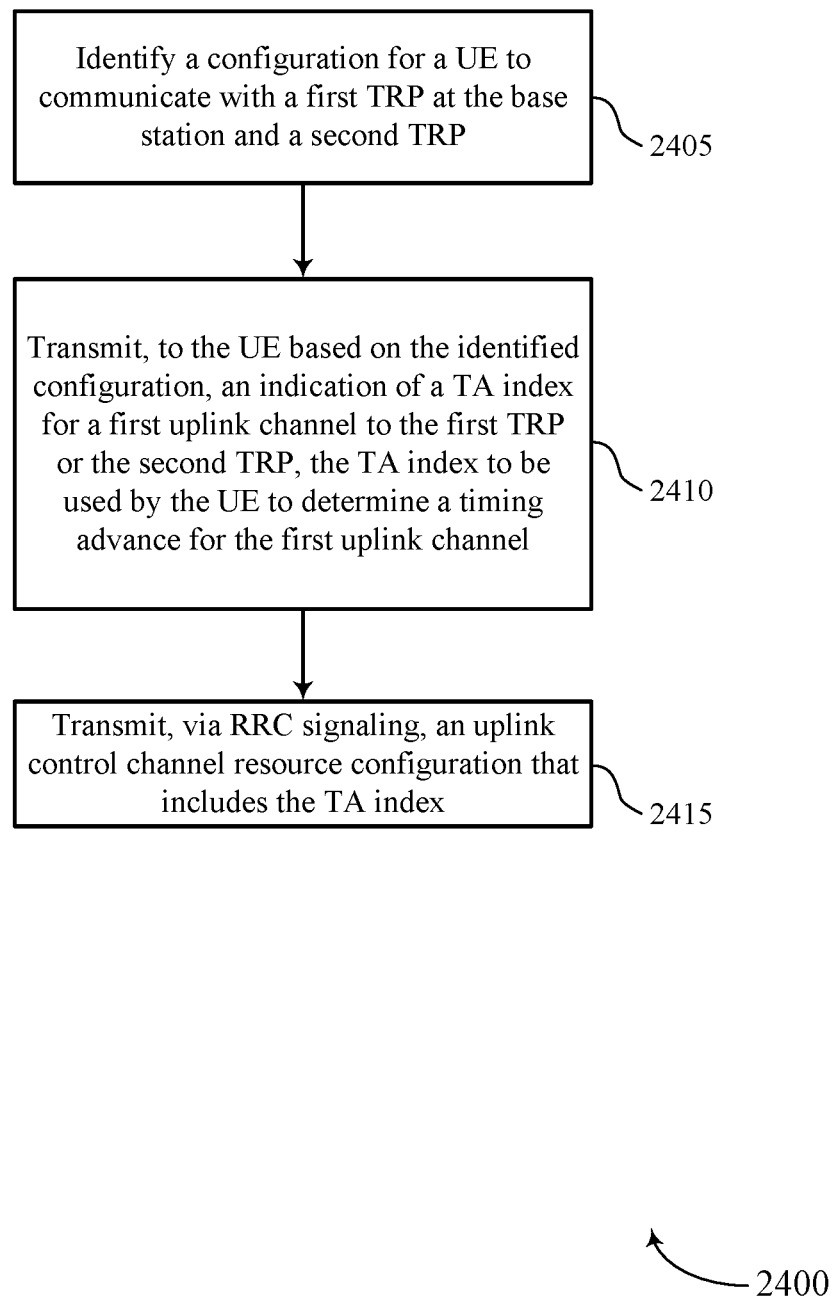

FIG. 24 shows a flowchart illustrating a method 2400 that supports multiple TA design for multiple TRPs in accordance with aspects of the present disclosure. The operations of method 2400 may be implemented by a base station 105, or a TRP, or its components as described herein. For example, the operations of method 2400 may be performed by a base station communications manager as described with reference to FIGS. 13 through 16. In some examples, a base station may execute a set of instructions to control the functional elements of the base station to perform the functions described below. Additionally or alternatively, a base station may perform aspects of the functions described below using special-purpose hardware.

At 2405, the base station may identify a configuration for a UE to communicate with a first TRP at the base station and a second TRP. The operations of 2405 may be performed according to the methods described herein. In some examples, aspects of the operations of 2405 may be performed by a multiple TRP configuration component as described with reference to FIGS. 13 through 16.

At 2410, the base station may transmit, to the UE based on the identified configuration, an indication of a TA index for a first uplink channel to the first TRP or the second TRP, the TA index to be used by the UE to determine a TA for the first uplink channel. The operations of 2410 may be performed according to the methods described herein. In some examples, aspects of the operations of 2410 may be performed by a TA indication transmitter as described with reference to FIGS. 13 through 16.

At 2415, the base station may transmit, via RRC signaling, an uplink control channel resource configuration that includes the TA index. The operations of 2415 may be performed according to the methods described herein. In some examples, aspects of the operations of 2415 may be performed by a PUCCH resource transmitter as described with reference to FIGS. 13 through 16.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project"

(3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving a first indication of a first timing advance (TA) index for a first uplink channel and a second indication of a second TA index for a second uplink channel, the UE configured to communicate with a first transmit receive point (TRP) on the first uplink channel and a second TRP on the second uplink channel;
receiving a sounding reference signal (SRS) resource index (SRI);
identifying, based at least in part on the received SRI, the first TA index for the first uplink channel for the first TRP and the second TA index for the second uplink channel for the second TRP;
determining a first TA for the first uplink channel and a second TA for the second uplink channel, the first TA based at least in part on the first indication of the first TA index and the second TA based at least in part on the second indication of the second TA index; and
transmitting on the first uplink channel to the first TRP according to the first TA and on the second uplink channel to the second TRP according to the second TA.

2. The method of claim 1, wherein receiving the first indication of the first TA index for the first uplink channel and the second indication of the second TA index for the second uplink channel comprises:
receiving, via radio resource control (RRC) signaling, a sounding reference signal (SRS) resource, or a resource set configuration, or an uplink control channel resource configuration, that includes the first TA index and the second TA index.

3. The method of claim 1, wherein the SRI is received in downlink control information.

4. The method of claim 1, further comprising:
receiving a first TA command for the first TRP and a second TA command for the second TRP; and
identifying that the UE is to transmit to the first TRP, wherein the first TA for the first uplink channel is determined based at least in part on the first TA command by identifying that the UE is to transmit to the first TRP.

5. The method of claim 1, further comprising:
identifying that the UE is to transmit to the second TRP on the second uplink channel, wherein the second TA for the second uplink channel is determined based at least in part on a second TA command that includes the second TA index; and transmitting on the second uplink channel to the second TRP according to the second TA.

6. The method of claim 1, further comprising:
identifying a collision between a first signal to be transmitted on the first uplink channel and a second signal to be transmitted on the second uplink channel;
identifying a priority between a first TA command for the first uplink channel and a second TA command for the second uplink channel; and
dropping the first signal or the second signal based at least in part on the identified priority.

7. The method of claim 6, wherein identifying the priority between the first TA command for the first uplink channel and the second TA command for the second uplink channel comprises:
prioritizing the first TA command over the second TA command based at least in part on the first TA command being associated with a primary TRP, or a semi-static configuration indicating the priority, or a service associated with the first signal to be transmitted on the first uplink channel, or the first TA command having been received more recently than the second TA command, or a combination thereof.

8. The method of claim 1, further comprising:
identifying a collision between a first signal to be transmitted on the first uplink channel and a second signal to be transmitted on the second uplink channel;
spatially multiplexing the first uplink channel and the second uplink channel in accordance with a spatial multiplexing configuration; and
simultaneously transmitting the first signal and the second signal on the spatially multiplexed uplink channel and the second uplink channel.

9. The method of claim 1, wherein the first uplink channel to the first TRP comprises one of a sounding reference signal resource, or a physical uplink shared channel, or a physical uplink control channel.

10. The method of claim 9, wherein the second uplink channel to the second TRP comprises a different one of the sounding reference signal resource, or the physical uplink shared channel, or the physical uplink control channel.

11. The method of claim 9, wherein the second uplink channel to the second TRP comprises a same one of the sounding reference signal resource, or the physical uplink shared channel, or the physical uplink control channel.

12. The method of claim 1, wherein the UE is configured to communicate with the first TRP and the second TRP in a same component carrier.

13. A method for wireless communication at a base station, comprising:
identifying a first timing advance (TA) index for a first uplink channel and a second TA index for a second uplink channel;
identifying a configuration for a UE to communicate with a first transmit receive point (TRP) at the base station on the first uplink channel and a second on the second uplink channel;
transmitting a sounding reference signal (SRS) resource index (SRI) that indicates the first TA index and the second TA index; and
transmitting, to the UE based at least in part on the identified configuration, a first indication of the first TA index for the first uplink channel to the first TRP and a second indication of the second TA index for the second uplink channel to the second TRP, the first TA index to be used by the UE to determine a first TA for the first uplink channel and the second TA index to be used by the UE to determine a second TA for the second uplink channel.

14. The method of claim 13, wherein transmitting the first indication of the first TA index for the first uplink channel and the second indication of the second TA index for the second uplink channel comprises:
transmitting, via radio resource control (RRC) signaling, a sounding reference signal (SRS) resource, or a resource set configuration, or an uplink control channel resource configuration, that includes the first TA index and the second TA index.

15. The method of claim 13, wherein the SRI is transmitted in downlink control information.

16. The method of claim 13, further comprising:
transmitting the second indication of the second TA index for the second uplink channel to the second TRP to the UE based at least in part on the identified configuration.

17. The method of claim 13, wherein the first uplink channel to the first TRP comprises a sounding reference signal resource, or a physical uplink shared channel, or a physical uplink control channel.

18. The method of claim 17, wherein the second uplink channel to the second TRP comprises a different one of the sounding reference signal resource, or the physical uplink shared channel, or the physical uplink control channel.

19. The method of claim 17, wherein the second uplink channel to the second TRP comprises a same one of the sounding reference signal resource, or the physical uplink shared channel, or the physical uplink control channel.

20. An apparatus for wireless communication at a user equipment (UE), comprising:
a processor,
memory coupled with the processor; and
instructions stored in the memory and executable by the processor to cause the apparatus to:
receive a first indication of a first timing advance (TA) index for a first uplink channel and a second indication of a second TA index for a second uplink channel, the UE configured to communicate with a first transmit receive point (TRP) on the first uplink channel and a second TRP on the second uplink channel;
receive a sounding reference signal (SRS) resource index (SRI);
identify, based at least in part on the received SRI, the first TA index for the first uplink channel for the first TRP and the second TA index for the second uplink channel for the second TRP;
determine a first TA for the first uplink channel and a second TA for the second uplink channel, the first TA based at least in part on the first indication of the first TA index and the second TA based at least in part on the second indication of the second TA index; and
transmit on the first uplink channel to the first TRP according to the first TA and on the second uplink channel to the second TRP according to the second TA.

21. The apparatus of claim 20, wherein the instructions to receive the first indication of the first TA index for the first uplink channel and the second indication of the second TA index for the second uplink channel are executable by the processor to cause the apparatus to:
receive, via radio resource control (RRC) signaling, a sounding reference signal (SRS) resource, or a resource set configuration, or an uplink control channel resource configuration, that includes the first TA index and the second TA index.

22. The apparatus of claim 20, wherein the instructions are further executable by the processor to cause the apparatus to:
receive a first TA command for the first TRP and a second TA command for the second TRP; and
identify that the UE is to transmit to the first TRP, wherein the first TA for the first uplink channel is determined based at least in part on the first TA command by identifying that the UE is to transmit to the first TRP.

23. The apparatus of claim 20, wherein the instructions are further executable by the processor to cause the apparatus to:
identify a collision between a first signal to be transmitted on the first uplink channel and a second signal to be transmitted on the second uplink channel;
identify a priority between a first TA command for the first uplink channel and a second TA command for the second uplink channel; and
drop the first signal or the second signal based at least in part on the identified priority.

24. The apparatus of claim 20, wherein the instructions are further executable by the processor to cause the apparatus to:
identify a collision between a first signal to be transmitted on the first uplink channel and a second signal to be transmitted on the second uplink channel;
spatially multiplex the first uplink channel and the second uplink channel in accordance with a spatial multiplexing configuration; and
simultaneously transmit the first signal and the second signal on the spatially multiplexed uplink channel and the second uplink channel.

25. An apparatus for wireless communication at a base station, comprising:
a processor,
memory coupled with the processor; and
instructions stored in the memory and executable by the processor to cause the apparatus to:
identify a first timing advance (TA) index for a first uplink channel and a second TA index for a second uplink channel;
identify a configuration for a UE to communicate with a first transmit receive point (TRP) at the base station on the first uplink channel and a second TRP on the second uplink channel;
transmit a sounding reference signal (SRS) resource index (SRI) that indicates the first TA index and the second TA index; and
transmit, to the UE based at least in part on the identified configuration, a first indication of the first TA index for the first uplink channel to the first TRP and a second indication of the second TA index for the second uplink channel to the second TRP, the first TA index to be used by the UE to determine a first TA for the first uplink channel and the second TA index to be used by the UE to determine a second TA for the second uplink channel.

26. The apparatus of claim 25, wherein the instructions to transmit the first indication of the first TA index for the first uplink channel and the second indication of the second TA index for the second uplink channel are executable by the processor to cause the apparatus to:
transmit, via radio resource control (RRC) signaling, a sounding reference signal (SRS) resource, or a resource set configuration, or an uplink control channel resource configuration, that includes the first TA index and the second TA index.

\* \* \* \* \*